George E. Conover
INVENTOR.

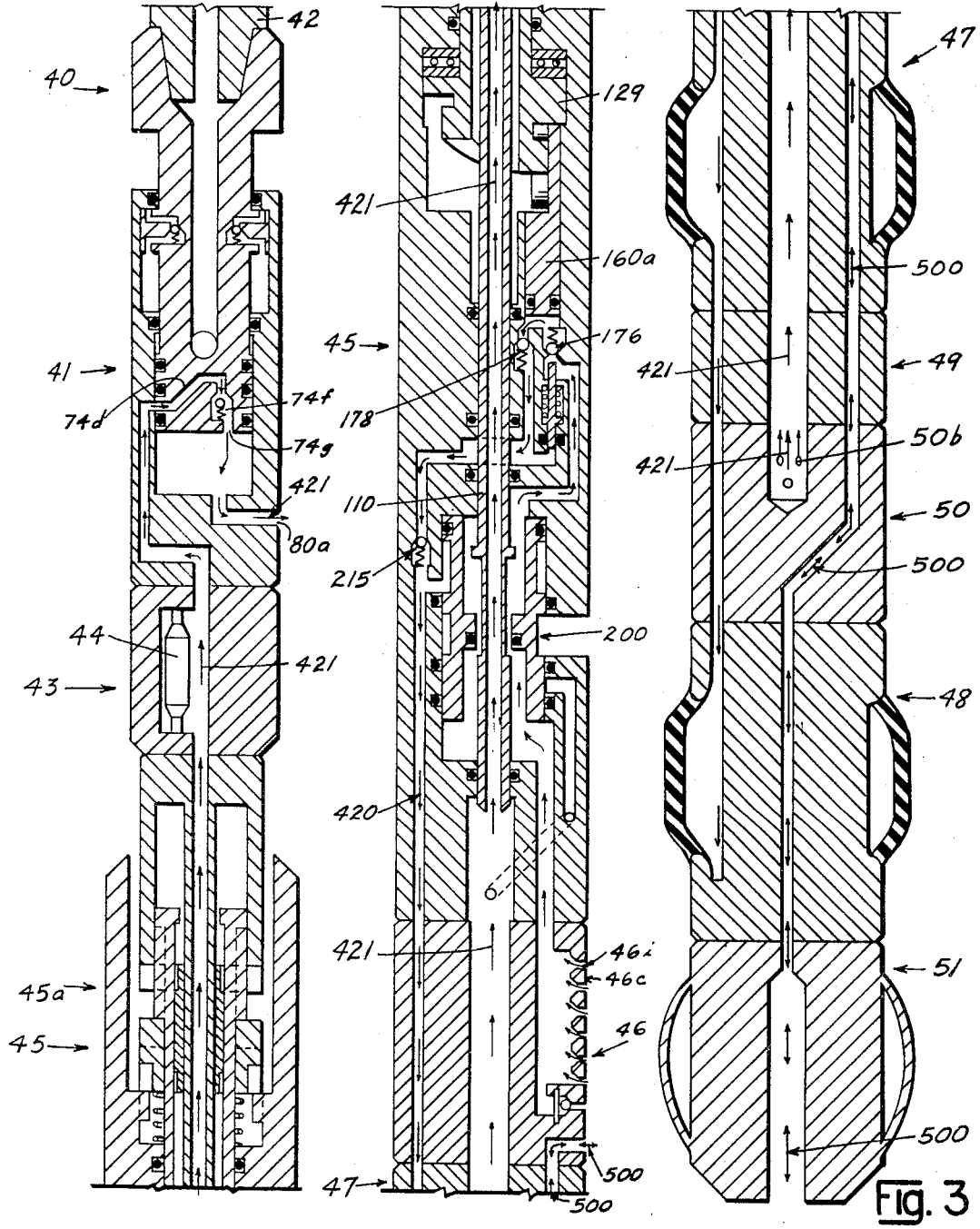

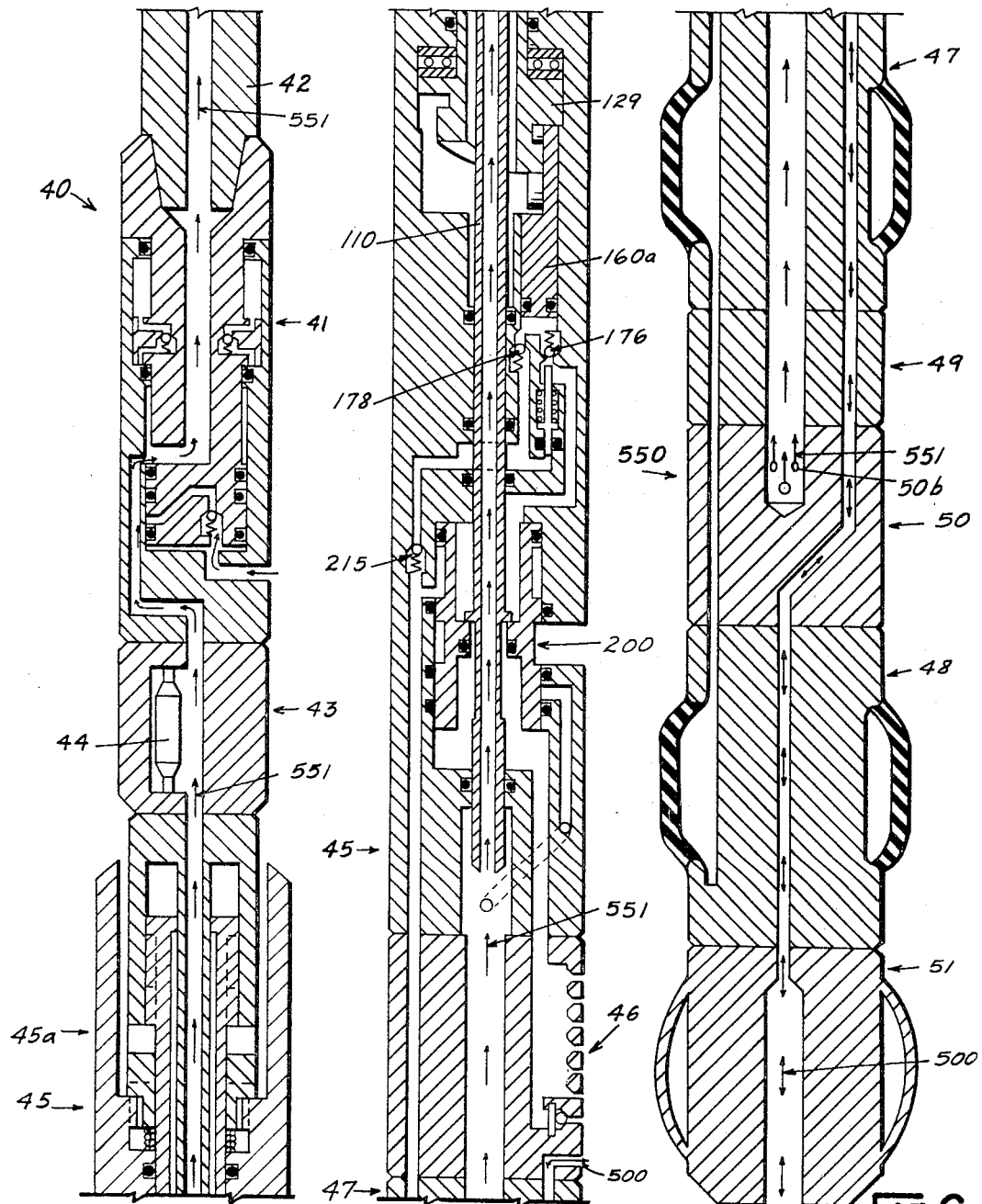

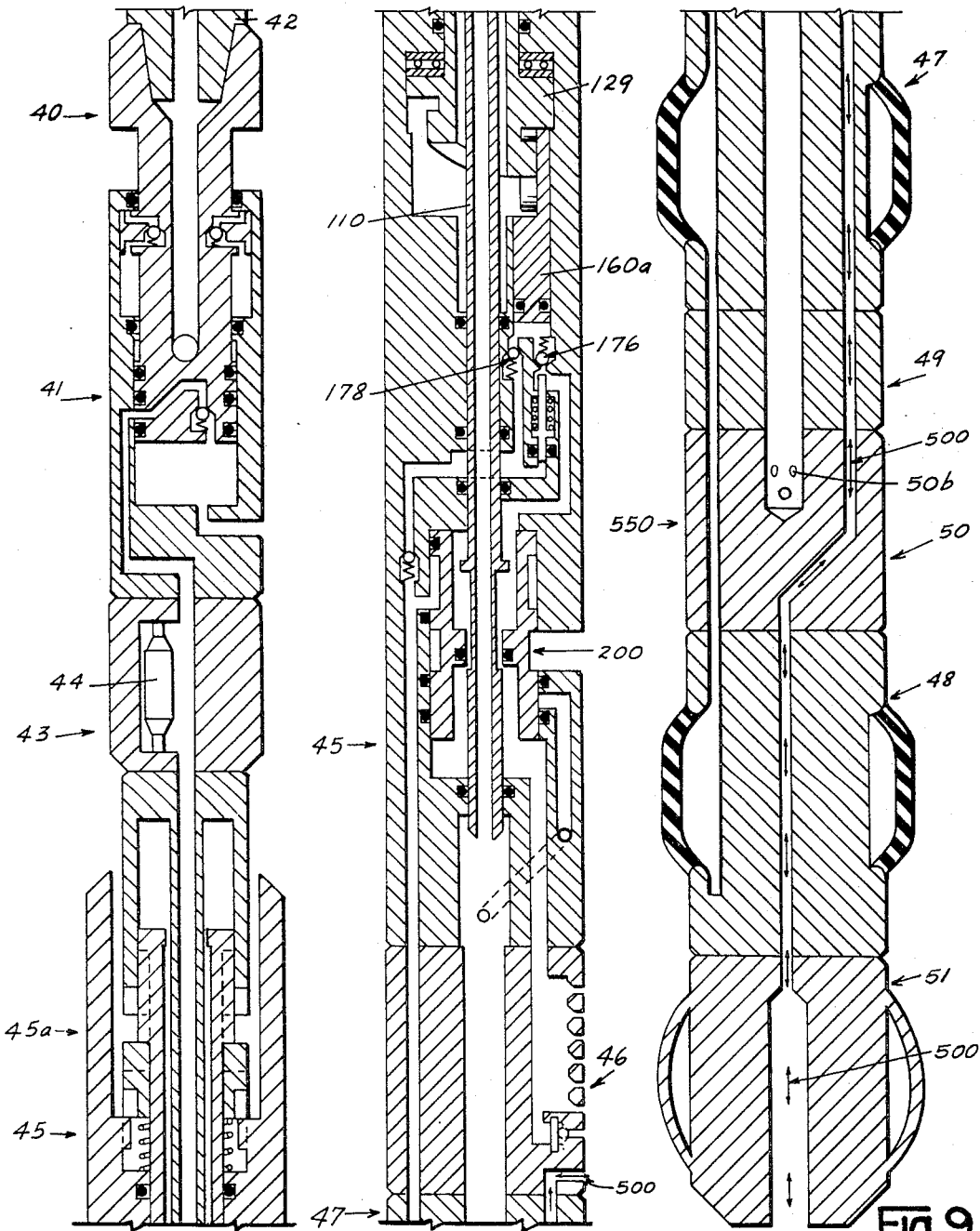

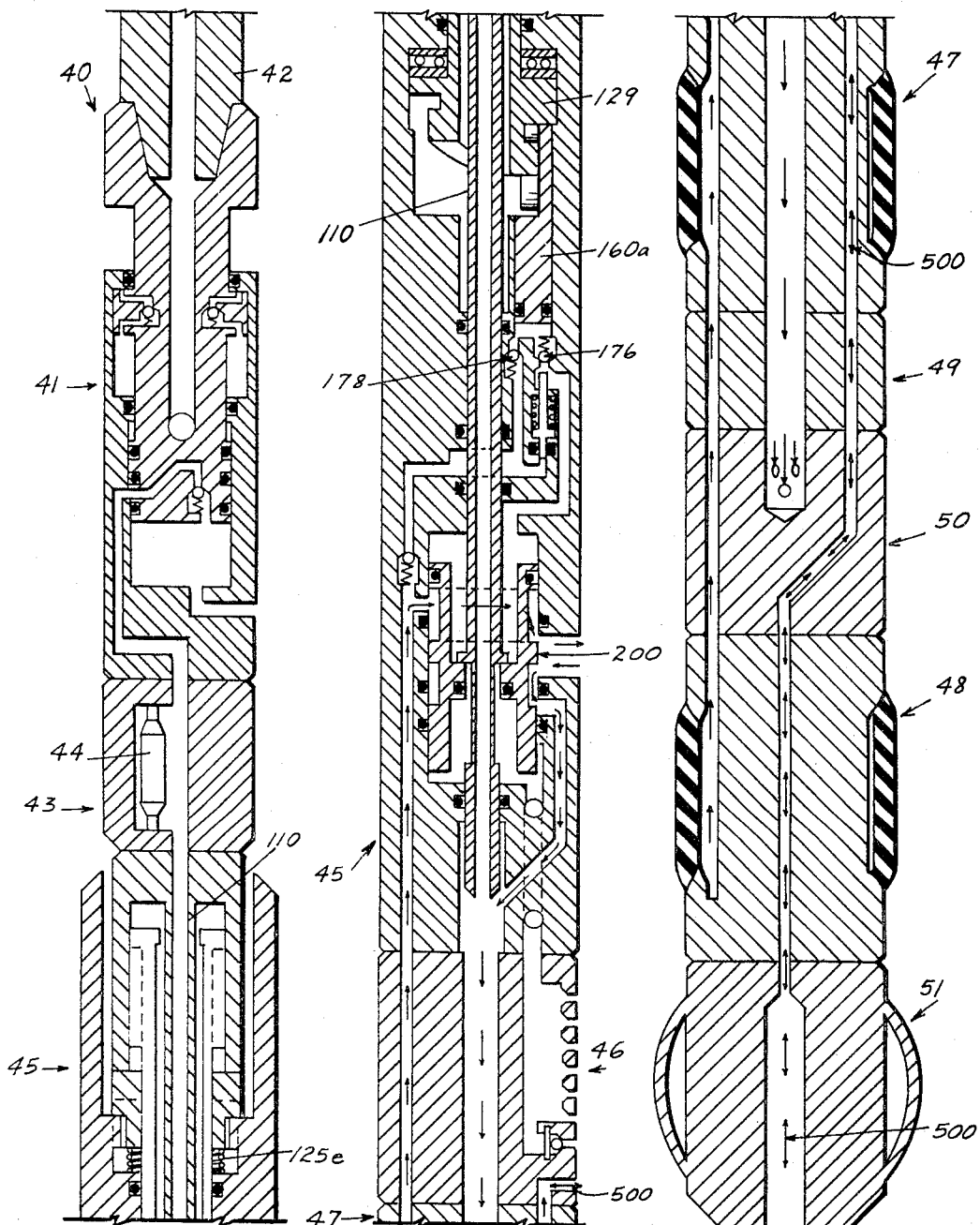

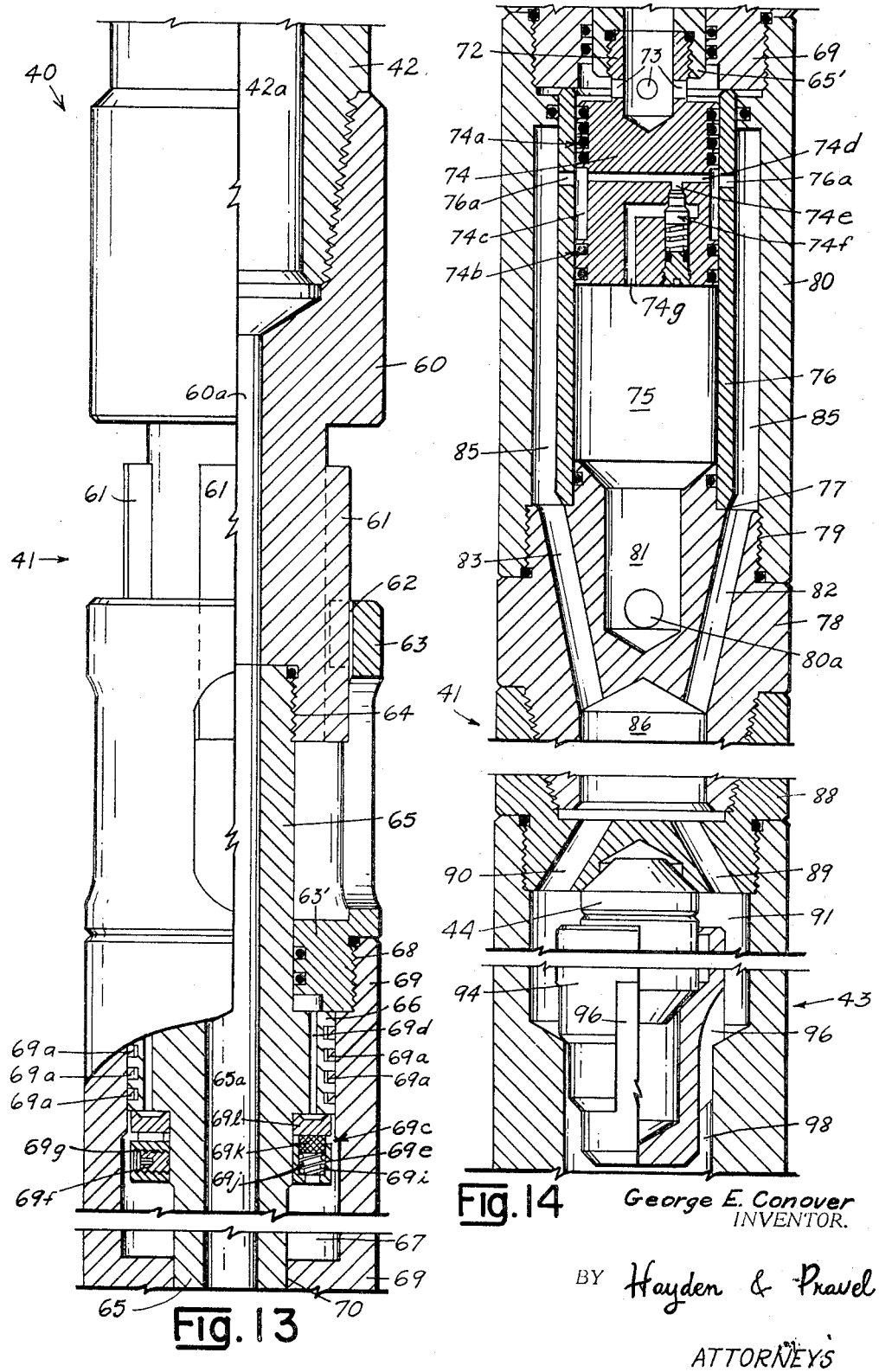

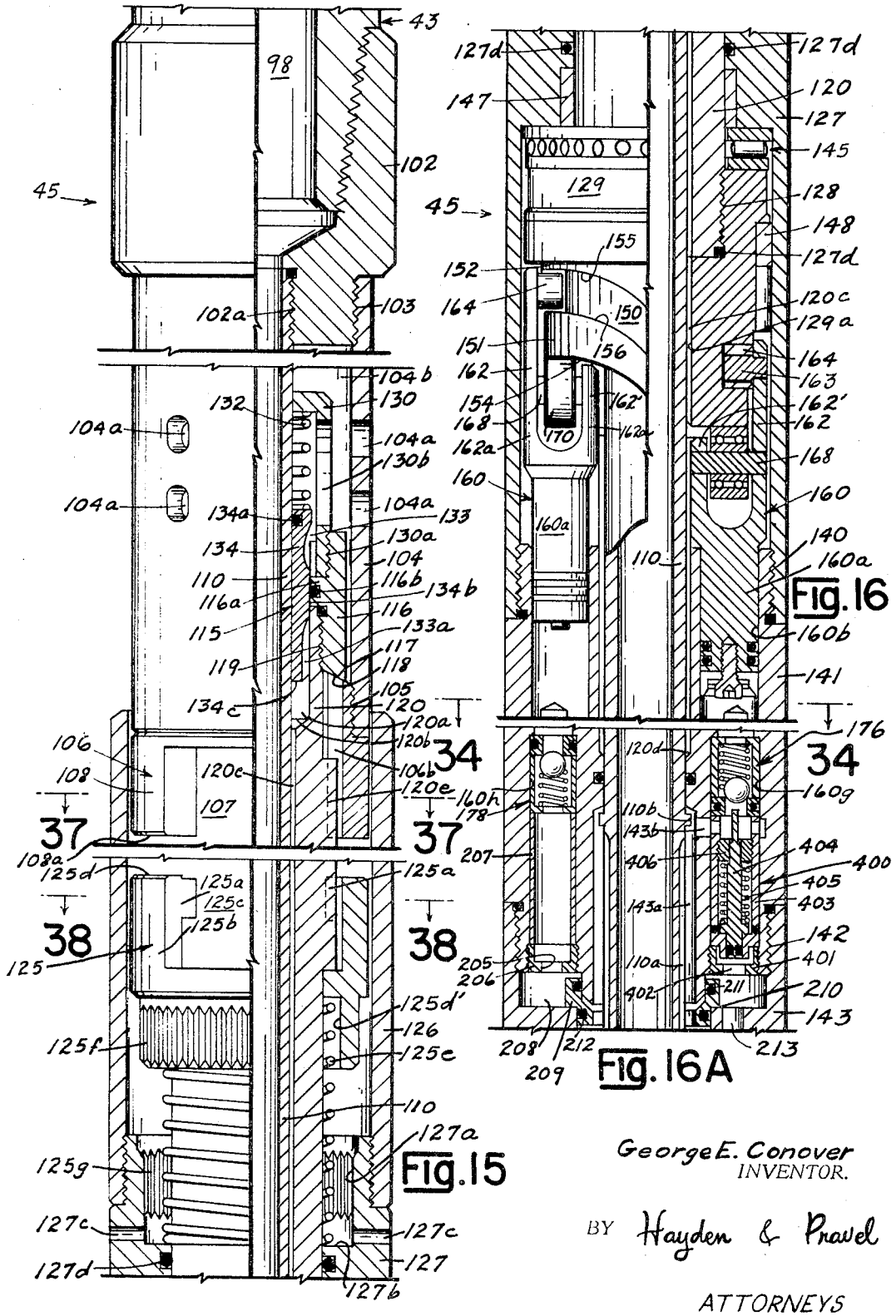

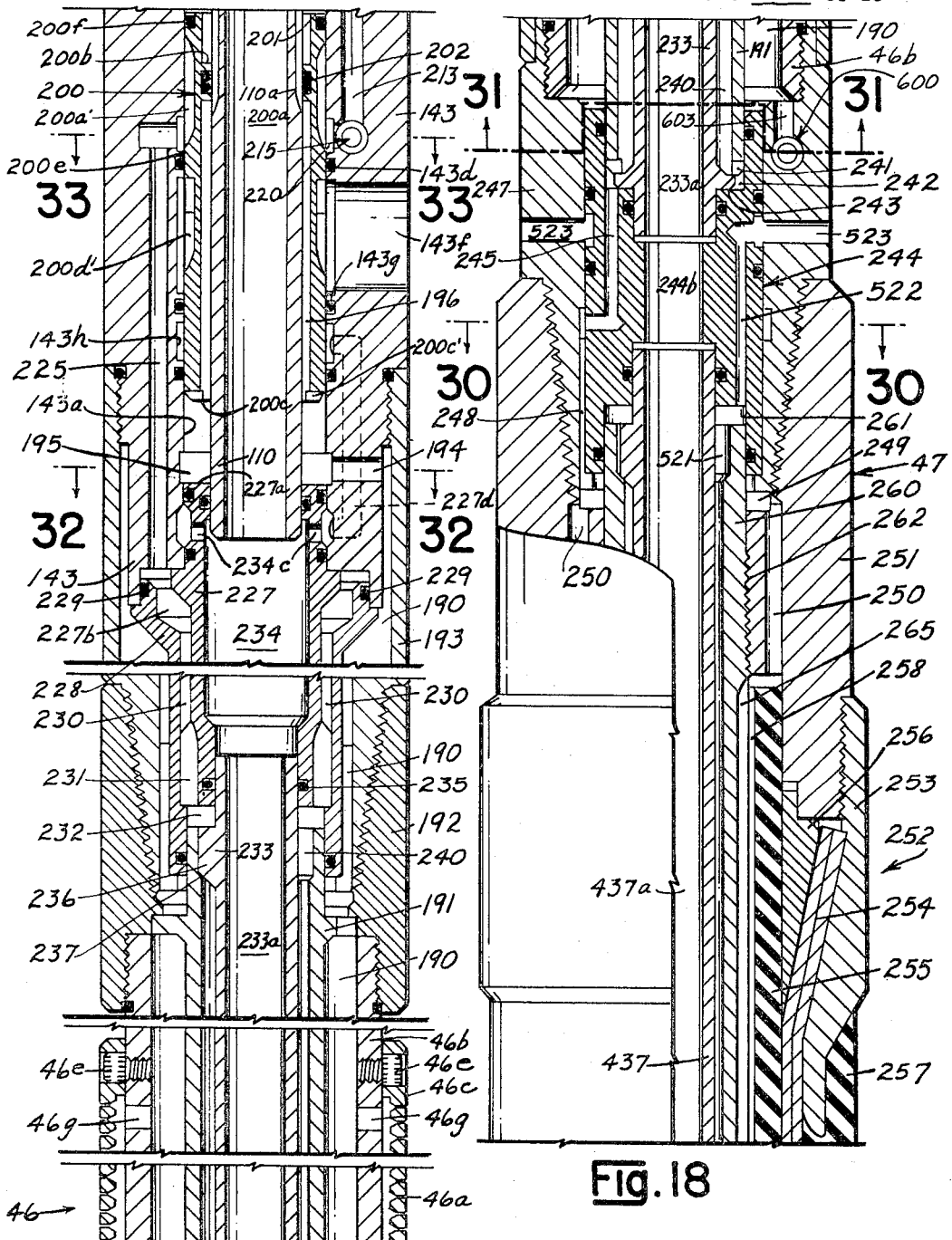

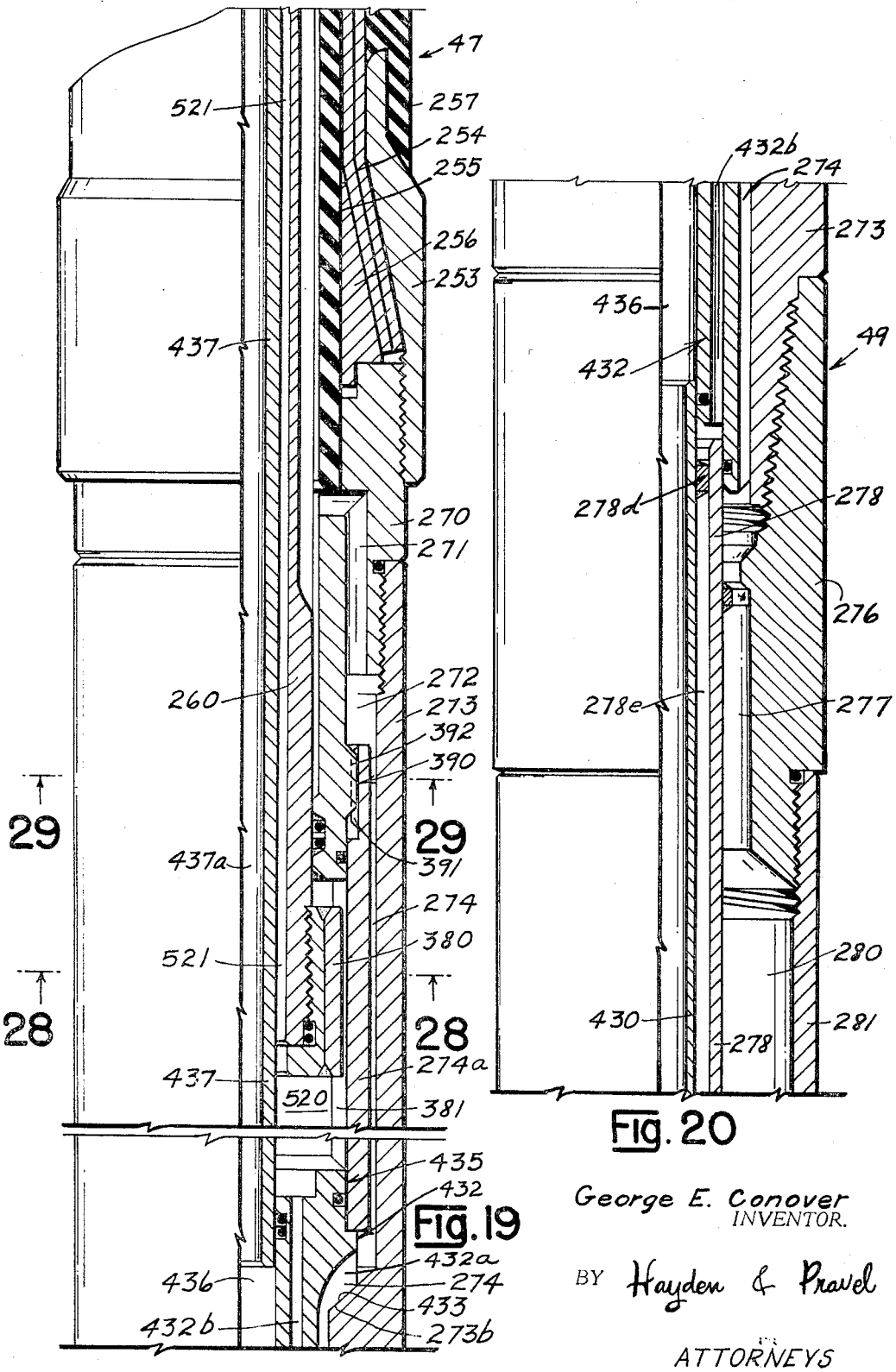

BY Hayden & Pravel

ATTORNEYS

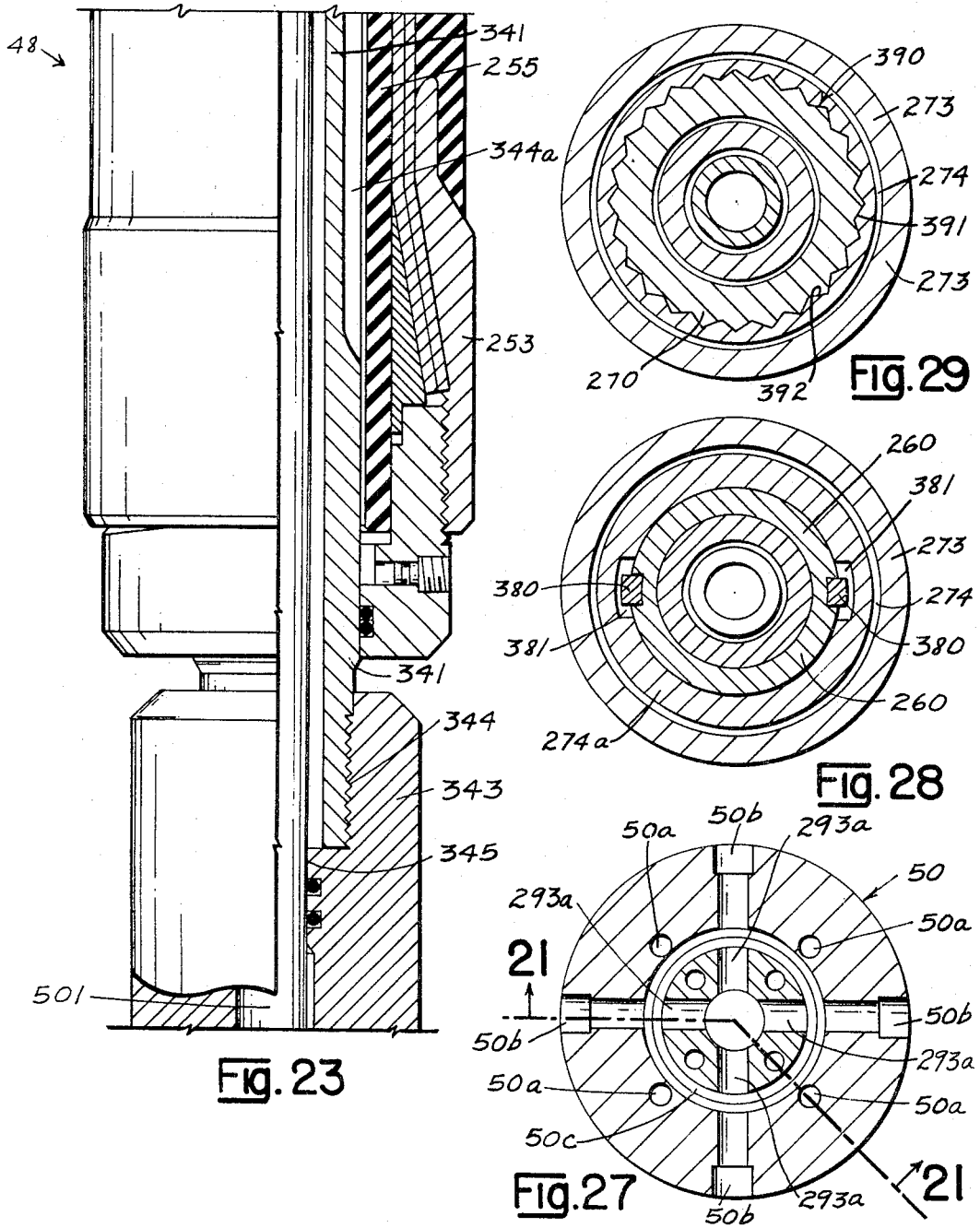

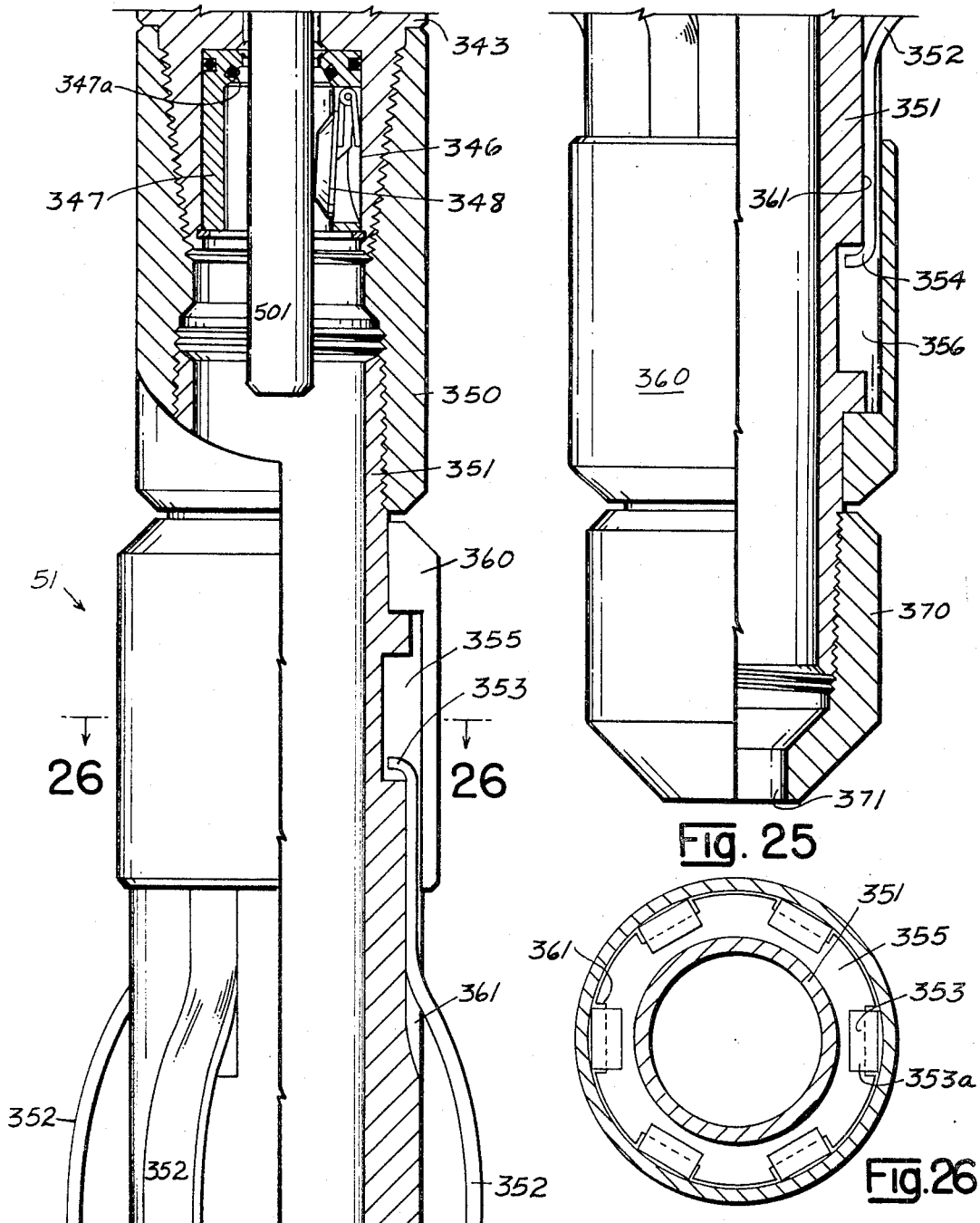

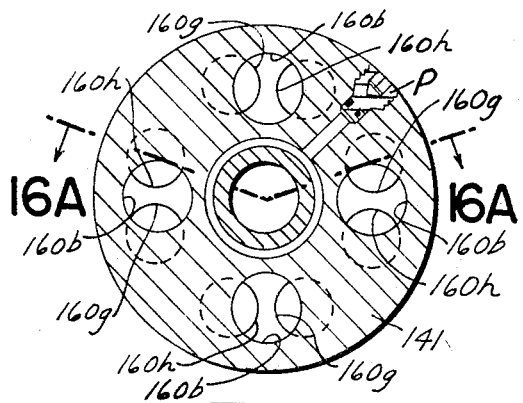
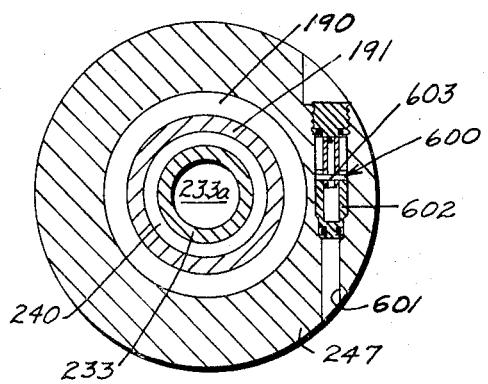
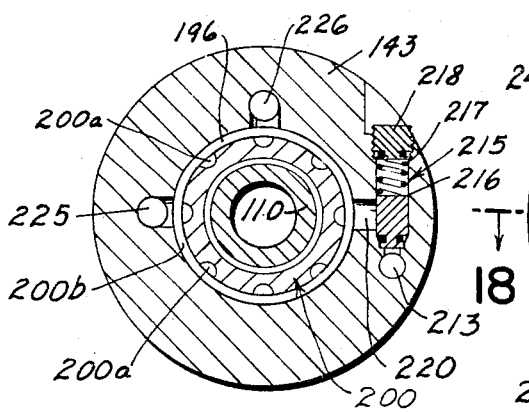
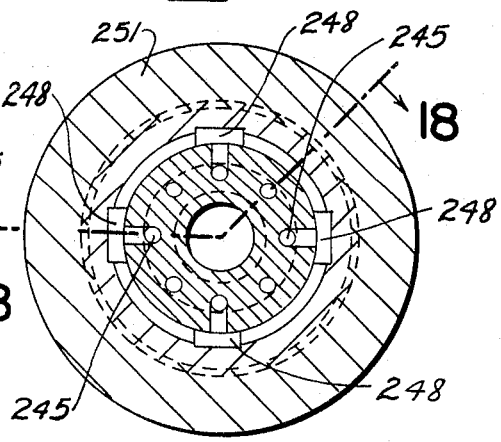
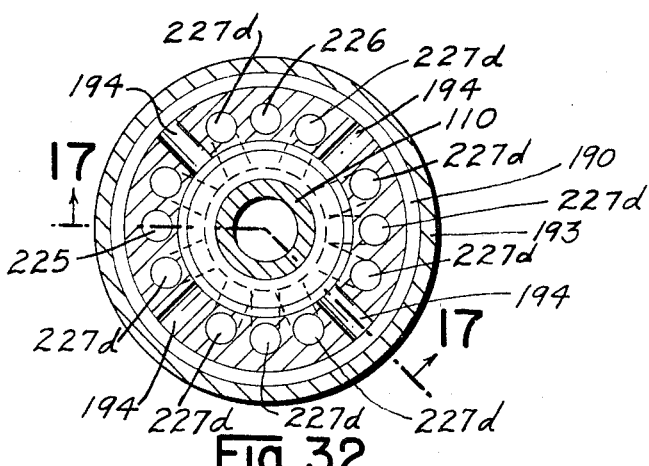

April 22, 1969 G. E. CONOVER 3,439,740
INFLATABLE TESTING AND TREATING TOOL AND METHOD OF USING
Filed July 26, 1966

George E. Conover
INVENTOR.

BY Hayden & Pravel
ATTORNEYS 3,439,740
INFLATABLE TESTING AND TREATING TOOL
AND METHOD OF USING
George E. Conover, P.O. Box 12486,
Houston, Tex. 77017
Filed July 26, 1966, Ser. No. 570,388
Int. Cl. E21b 49/00
U.S. Cl. 166—250  37 Claims

ABSTRACT OF THE DISCLOSURE

A testing or treating tool for use with tubular members in a well bore to isolate any desired zone or zones at one or more elevations in a well bore without necessarily removing the tool from the well bore.

---

Various treating and testing tools have been proposed and are in use at the present time for endeavoring to test a formation or zone of a well. Such devices include resilient elements normally termed "squeeze packers" which are mechanically set in the well bore, and when the formation or zone to be tested is spaced from the bottom of the well bore a "tail pipe," or extension must be employed to position the element at the desired elevation.

Such arrangement and its use have certain undesirable features such as, by way of example only, in connection with setting the squeeze packers, and it is determined that one or more of the packers is leaking, then it is impossible to reset them when a tail pipe is used. Also, it is impossible to test more than one zone off bottom without first retrieving the tubular member on which the squeeze packers are mounted and then placing a different length extension or tail piece below the squeeze packers before lowering them into the well bore for another test.

Also, the manner of effecting a test with a squeeze packer tool is somewhat more complicated relative to the steps involved in use of the present invention.

Summary of the invention

An object of the present invention is to provide in a well tool, such as by way of example, a well testing or treating tool, a pump carried by the tubular member upon which one or more reinforced inflatable elements are carried, which pump functions upon rotation of the tubular member at the earth's surface to inflate the elements with fluid from the well surrounding the tool.

An object of the present invention is to provide in a well tool, such as by way of example, a well testing or treating tool, a pump carried by the tubular member upon which one or more reinforced inflatable elements are carried, which pump functions upon rotation of the tubular member at the earth's surface to inflate the elements with fluid from the well surrounding the tool, and wherein said pump is constructed and arranged so that it will cease pumping when the inflatable elements are pressured to a predetermined pressure above the pressure in the well at the elevation at which the tool is being used.

Another object of the invention is to provide in a well testing tool employing one or more inflatable elements carried on a tubular member and which may be inflated to sequentially isolate one or more zones in the well without removing the tool from the well between each isolation, means to permit the well fluid trapped between the inflatable elements to escape to the well bore to avoid forcing such fluid back into the isolated formation to be tested while the elements are being inflated.

A still further object of the invention is to provide in a well testing tool incorporating spaced inflatable elements on a tubular member for inflation thereof to seal off one or more zones in a well bore, bypass means for equalizing pressure in the well bore above and below spaced inflatable elements at all times, said bypass means providing a visual indication at the surface of any change in fluid level in the well bore as an indication of communication of fluid around the lowermost of said inflatable means.

Yet a further object of the invention is to provide in a well tool incorporating inflatable elements a valve means to communicate the interior of the inflatable elements and the space betweeen the inflatable elements with the well bore when the elements are deflated so that the pressure internally of the inflatable elements is substantially equalized with the pressure in the well bore between the elements as they deflate and unseat from the well bore.

A further object of the invention is to provide a method of testing at least one zone or formation at any desired elevation or elevations in a well comprising the steps of lowering a tubular member with one or more inflatable elements thereon into the well, rotating the tubular element to pump well fluid into the elements to seat them against the wall of the well and isolate a portion of the well, setting weight down on the tubular member after the elements are seated against the well wall to obtain a flow test of the isolated portion of the well, removing the weight set on the tubular member to obtain a shut-in pressure of the isolated portion with a pressure recorder carried by the tubular member, and thereafter setting weight and rotating the tubular member to actuate a valve means that communicates the interior of the inflatable elements and the isolated portion with the well bore to equalize and enable the elements to unseat.

Another object of the invention is to provide in a test tool having inflatable elements thereon that is adapted to be supported in a well on a tubular member pump means operable by rotation of the tubular member to pump fluid to inflate the elements.

Still another object of the invention is to provide a method of isolating a zone in a well with one or more inflatable elements on a tool adapted to be supported in the well on a tubular member, the steps of inflating the elements by rotation of the tubular member, and setting weight on the tubular member and rotating it to deflate the elements.

Yet a further object of the invention is to provide in a well tool having at least one inflatable element thereon and adapted to be supported in a well on a tubular member, pump means associated with the tool operable by rotation of the tubular member to pump fluid to inflate the element, and equalizing means for equalizing the fluid pressure in the well adjacent the location of the tool in the well with the pressure of the lubricating fluid in the pump.

Still another object of the invention is to provide a test tool having at least one inflatable element that may be inflated to isolate a zone in a well, means for deflating the element, and means for reinflating the element without removing the tool from the well bore.

A further object of the invention is to provide in a well tool having at least one inflatable element for isolating a zone in a well and adapted to be supported on a tubular member in the well, valve means associated with passage means for inflating and deflating the inflatable elements, pump means operable by rotation of the tubular member with the valve in one position to pump fluid to inflate the elements, said valve movable to another position by setting weight on the tubular member and rotating it to communicate the interior of the elements to the well for deflation thereof.

Still a further object of the invention is to provide in a tool having spaced inflatable elements for isolating a zone in a well and adapted to be supported on a tubular member in the well, valve means associated with passage means for inflating and deflating the elements, pump ments, said valve movable to another position by setting the valve in one position to pump fluid to inflate the elements, said valve movable to another position by setting weight on the tubular member and rotating it to communicate the interior of the elements to the well for deflation thereof while simultaneously communicating the isolated zone with the well to aid in equalizing pressures around the elements as they deflate.

Other objects and advantages of the present invetnion will become more readily apparent from a consideration of the following description and drawings wherein:

FIGS. 1, 2, and 3 are schematic sectional views of the upper, middle, and lower portions of the tool, respectively, and diagrammatically illustrate the relationship of the components of the tool during inflation of the packers;

FIGS. 4, 5, and 6 are schematic sectional views of the upper, middle, and lower portions of the tool, respectively, and schematically illustrate the relationship of certain components of the tool when it is making a flow test;

FIGS. 7, 8, and 9 are schematic sectional views of the upper, middle, and lower portions of the tool, respectively, and diagrammatically illustrate the relationship of certain components of the tool when it is taking a shut-in pressure test;

FIGS. 10, 11, and 12 are schematic sectional views of the upper, middle, and lower portions of the tool, respectively, and diagrammatically illustrate the relationship of certain components of the packers after a treating or testing operation in a well bore;

FIG. 13 is a sectional view of the upper end of the tool showing it connected to the lower end of a tubular member such as a drill string or the like and the upper end portion of the hydraulic tool;

FIG. 14 is a continuation of FIG. 13 and is a sectional view showing the lower portion of the hydraulic tool and the pressure recorder and pressure recorder housing partly in section and partly in elevation;

FIG. 15 is a continuation of FIG. 14 and a sectional view partly in elevation illustrating a clutch arrangement used in the tool and also shows the upper portion of the pump unit used for inflating the packer including means for aiding in equalizing pressure in the well bore with the oil in the crankcase of the pump;

FIG. 16 is a continuation of FIG. 15 partly in section and partly in elevation and illustrates another portion of the pumping unit used for inflating the inflatable element or elements forming part of the test tool;

FIG. 16A is a sectional view on the line 16A—16A of FIG. 34 and is a continuation of FIG. 16 showing in section one inlet valve on the right and one outlet valve on the left used for supplying fluid to and discharging fluid from the pump forming part of the present invention;

Figures 21, 22:
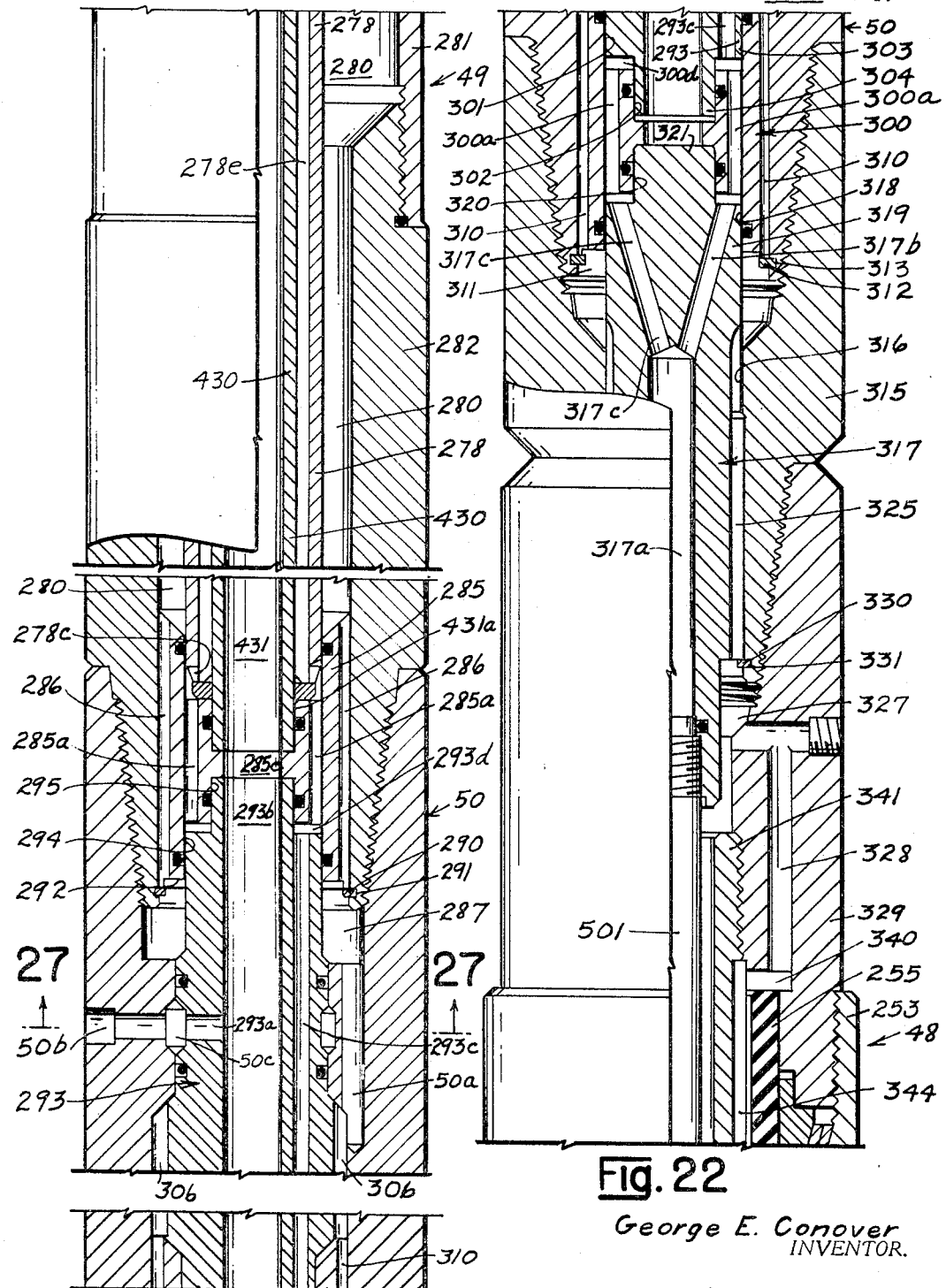
Figure 36:
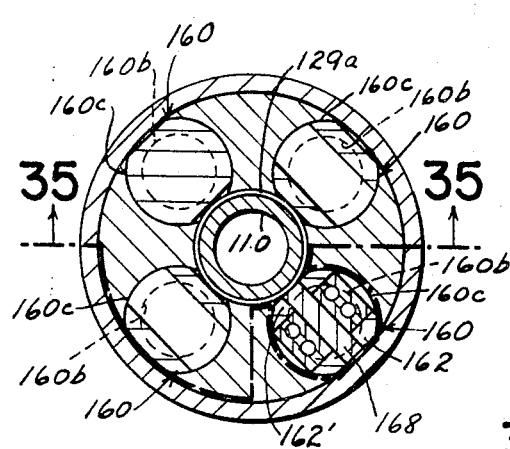
Figure 35:
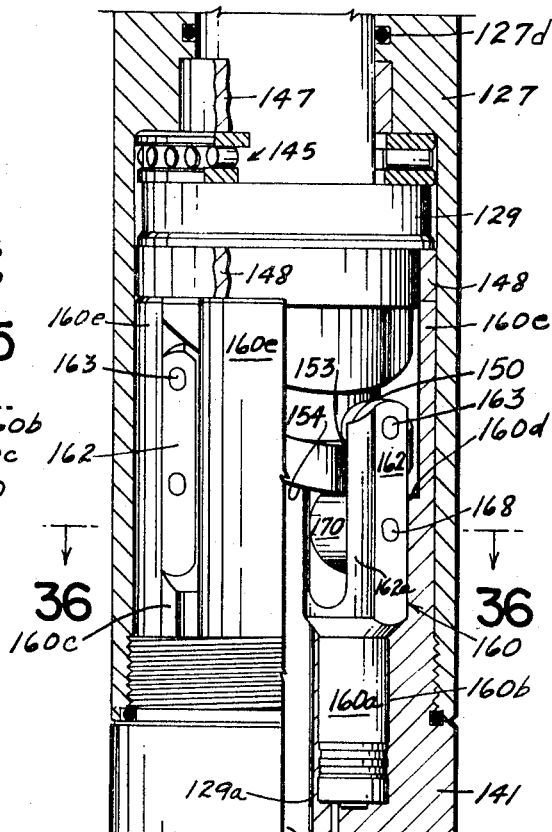
Figure 37:
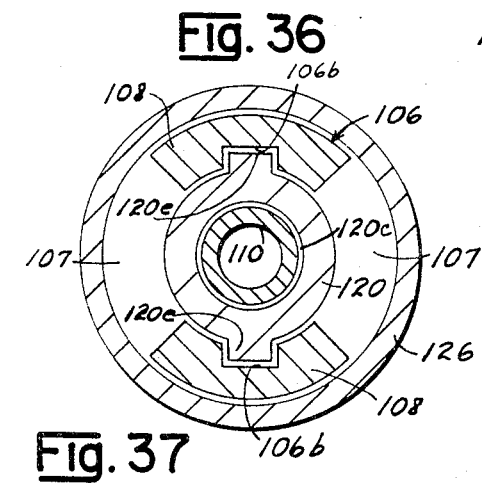
Figure 38:
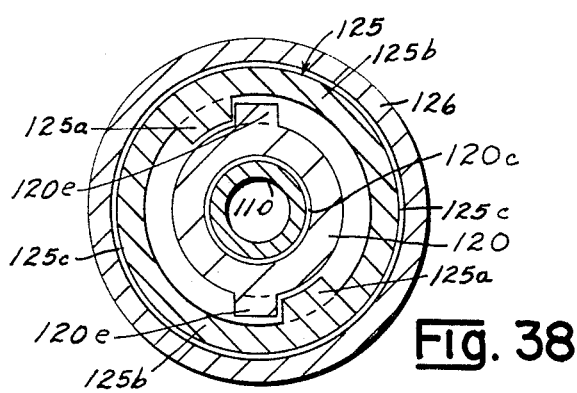

FIG. 17 is a continuation of the tool from FIG. 16A and is a vertical broken sectional view on the line 17—17 of FIG. 32 showing a sleeve valve for controlling communication through various conduits in the tool and illustrates at the lower end thereof a screen for receiving well fluids therethrough from the annulus of the well surrounding the tool whereby the fluids may be conducted to the pump unit for inflation of the packers;

FIG. 18 is a continuation of the tool shown in FIG. 17 and is a sectional view on the line 18—18 of FIG. 30 showing at the upper end portion a shear relief valve which permits fluid from the well to pass directly to the pump if the screen shown at the lower end of FIG. 17 clogs; the lower end of FIG. 18 shows the upper end of an inflatable element;

FIG. 19 is a continuation of the tool shown in FIG. 18 and is a broken sectional view illustrating at the upper end thereof the lower end of the packer section shown in the lower end portion of FIG. 18;

FIG. 20 is a sectional view partly in elevation which is a continuation of the tool shown in FIG. 19 and illustrates certain of the flow passages in the tool;

FIG. 21 is a continuation of the tool shown in FIG. 20 and is a sectional view on the line 21—21 of FIG. 27 showing some of the flow passages in the tool and illustrating a port for communicating with the well bore below a packer where only one inflatable packer is used on the tool or for communicating with the well bore between spaced packers on the tool;

FIG. 22 is a continuation of the tool shown in FIG. 21 and is a sectional view partly in elevation showing some of the flow passages in the tool and the upper end of an additional inflatabl packer element used in connection with the embodiment of the invention described herein;

FIG. 23 is a continuation of the tool shown in FIG. 22 and is a sectional view partly in elevation illustrating the lower end of the packer element shown in FIG. 22 and some of the flow conduits through the tool;

FIG. 24 is a continuation of the tool illustrated in FIG. 23 and is shown partly in section and partly in elevation and shows the lower end of the bypass for communicating the well bore below the lowermost inflatable packer element with the well bore above the uppermost packer and also shows a spring arrangement to restrain rotation of the tool in a well bore when the tubular member on which the tool is carried is rotated at the earth's surface to actuate the pump to inflate the packer elements used in connection with the tool;

FIG. 25 is a continuation of FIG. 24 and is partly in section and partly in elevation and shows the lower end of the tool;

FIG. 26 is a sectional view on the line 26—26 of FIG. 24 illustrating means for securing the upper end of the spring arrangement shown in FIG. 24 with the tool;

FIG. 27 is a sectional view on the line 27—27 of FIG. 21 and shows the flow ports to the annulus between spaced packer elements where two packers elements are used in connection with the tool and other flow passages through the tool;

FIG. 28 is a sectional view on the line 28—28 of FIG. 19 and illustrates a key and keyway arrangement in the tool;

FIG. 29 is a sectional view on the line 29—29 of FIG. 19 and illustrates a spline arrangement in the tool;

FIG. 30 is a sectional view on the line 30—30 of FIG. 18 showing the arrangement of certain flow passages in the tool;

FIG. 31 is a sectional view of the line 31—31 of FIG. 18 showing in greater detail the arrangement of a shear relief valve for conducting fluid directly to the packers to be inflated if the screen shown at the lower end of FIG. 17 becomes clogged;

FIG. 32 is a sectional view on the line 32—32 of FIG. 17 and illustrating in greater detail some of the flow passages in the tool;

FIG. 33 is a sectional view on the line 33—33 of FIG. 17 and shows in greater detail the master check valve communicating with the discharge end of the pumping unit and ports for communicating fluid from the master check valve to the inflatable packer elements;

FIG. 34 is a sectional view on the line 34—34 of FIG. 16 and illustrates in solid line the four cylinders which receive the pistons shown in FIG. 35 and illustrates in partial solid and partial dotted line the intake and outlet discharge ports for each cylinder;

FIG. 35 is a sectional view on the line 35—35 of FIG. 36 showing the arrangement of the pistons and the rotatable cam element for moving the pistons up and down in their respective cylinders in the pumping unit;

FIG. 36 is a sectional view on the line 36—36 of FIG. 35 and shows the arrangement of the pistons in section;

FIG. 37 is a sectional view on the line 37—37 of FIG. 15 showing in greater detail a portion of a form of the clutch arrangement used in the present invention; and FIG. 38 is a sectional view on the line 38—38 of FIG. 15 and showing further details of the form of the clutch arrangement used with the present invention.

Attention is first directed to FIGS. 1, 2, and 3 of the drawings which are diagrammatic representations of the upper, middle, and lower portions of the tool, respectively, and schematically illustrate the relationship of the components of the tool after the device has been lowered into the well bore and during inflation of the inflatable elements.

The invention is represented generally by the numeral 40 and includes a hydraulic tool portion represented generally by the numeral 41 which is adapted to be secured at its upper end to a tubular member such as a drill string or the like represented at 42. Secured to the lower end of the hydraulic tool is the pressure recording housing represented generally by the numeral 43 having the pressure recorder 44 supported therein.

Secured to the pressure recorder housing 43 at its lower end is the pumping unit referred to generally by the numeral 45 which serves the function of inflating the packer or packer elements when the treating and testing tool has been positioned at the desired elevation in the well bore. The clutch arrangement at the upper end of the pumping unit to aid in deflating the packers is represented at 45a.

Secured to the lower end of the pumping unit 45 is the screen sub represented generally by the numeral 46 whereby fluid from the well bore annulus may be supplied to the pumping unit 45 for subsequent discharge under pressure for inflation of the inflatable packer or packer elements where more than one is used.

As illustrated in the modification shown in the drawings, two inflatable packer elements are employed, one reinforced inflatable packer element being represented by the numeral 47 and the other reinforced inflatable packer element being represented generally by the numeral 48. Suitable spacing may be provided between the packer sections 47 and 48 to provide the desired spacing between the elements for isolating a zone or formation in the well, one such spacing arrangement being illustrated generally by the numeral 49 and shown as being connected immediately beneath the upper inflatable packer element 47. Connected beneath the spacer element 49 is the port sub referred to generally by the numeral 50 which provides a means for communication with the well bore annulus between the spaced packer sections 47 and 48. Where only one inflatable element is used, generally the port sub 50 will be positioned beneath the single inflatable element.

The lower packer element 48 is secured to the port sub 50 as illustrated in FIG. 3 and secured to the lower end of the lower packer element 48 is the bow spring section represented generally by the numeral 51.

The corresponding sections of the embodiments of the invention as illustrated in the drawings are similarly numbered in each FIGS. 4, 5, and 6; 7, 8, and 9; and 10, 11, and 12.

FIGS. 4, 5, and 6 illustrate schematically the relationship of the components of the form of the invention illustrated when it is in condition for making a flow test of the isolated zone or formation between the inflated packer elements 47 and 48 which are inflated to seal off a portion of the well bore therebetween.

FIGS. 7, 8, and 9 illustrate schematically the relationship of the components of the invention as illustrated when a shut-in pressure test of the isolated, or sealed off, formation between the inflatable packer elements 47 and 48 is taken.

FIGS. 10, 11, and 12 illustrate schematically the relationship of the components of the invention as illustrated when the inflatable packers are being deflated, after the testing has been completed. At this time, the tool 40 may be removed from the well, or if desired, moved to another portion of the well bore for testing operations.

Attention is now directed to FIGS. 13 through 36, inclusive, wherein a preferred form of the invention is shown in greater detail and is illustrated in position ready to run into a well bore to perform a testing or treating operation.

In FIG. 13, the lower end of the tubular member 42 such as a drill pipe or the like is shown as being connected to the tool 40 for lowering into the well bore. It is appreciated to those skilled in the art that the drill pipe, or tubular member 42, is connected to similar members to provide a length of pipe which extends to the earth's surface for manipulation of the tool 40, as will be described. The hydraulic tool section referred to generally by the numeral 41 is secured to the lower end of the tubular member 42 by any suitable means such as threads or the like as shown in FIG. 13. The uppermost part 60 of the hydraulic tool that is connected with the tubular member 42 is provided with a plurality of longitudinally extending keys 61 which fit within corresponding keyways 62 of the surrounding housing 63 as shown in FIG. 13 for transmitting rotation of the tool 40 for a purpose as will be described hereinafter and for enabling the weight of the string of tubular members 42 to be set down on the tool 40 as will be described.

The lower end of the member 60 is threadedly connected as shown at 64 to the extension 65 on which is integrally formed at 66 a piston which is received within the chamber 67 formed by radially and inwardly projecting part 63' of the housing 63 being threadedly connected as shown at 68 to the sub 69. There are suitable seal means as illustrated in FIG. 13 to seal between the extension 65 and the enlargement 63' upon relative longitudinal movement of the extension 65 and piston 66 within chamber 67 as will be described in greater detail hereinafter.

The extension 65 projects below the piston 66 as shown at the lower end of FIG. 13 and through the bore 70 formed in sub 69. The extension 65 is threadedly connected at its lower end 65' to an extension 72 which is provided with port means 73 as shown at the upper end of FIG. 14. The extension 72 is enlarged to form a piston 74 which is reciprocable within the chamber 75 formed by the sleeve 76 which abuts the lower end of housing 69 at its upper end and rests on shoulder 77 of the element 78 as shown in FIG. 14. The element 78 is threadedly connected at 79 to the housing 80 which surrounds the sleeve 76 and is circumferentially spaced therefrom to provide an annular passage 85 as shown in the drawings, the housing 80 being threadedly connected at its upper end to the housing 69 as shown at the upper end of FIG. 14 of the drawings.

The sleeve 76 is provided with port means 76a for a purpose as will be described in greater detail hereinafter.

The piston 74 is provided with seal means 74a adjacent its upper end which are spaced from seal means 74b at its lower end as shown in FIG. 14 for sealingly engaging with the internal wall of the sleeve 76. Extending between the packing means 74a and 74b on the external periphery of the piston 74 is a circumferential recess 74c which communicates with the passage 74d extending through the piston 74. A port 74e communicates with passage 74d, and a spring loaded check valve 74f normally closes off the port 74e to prevent communication between the passage 74d, port 74e, and the passage 74g which extends out the lower end of piston 74 and which passage 74g communicates with the check valve 74f.

Suitable seal means are arranged adjacent the sleeve 76 to inhibit the leakage of fluid during operation of the tool, and a port 80a is formed in the reduced bore 81 at the lower end of chamber 75 that communicates with the exterior of the tool for a purpose as will be described hereinafter.

The element 78 is provided with passage means 82 and 83 which communicate with the annular space formed between the housing 80 and sleeve 76 as shown in FIG. 14 of the drawing, such annular space being referred to by the numeral 85. It will be noted that the annular space 85 communicates with the port means 76a in sleeve 76 and the annular recess 74c formed on the external periphery of piston 74 as shown in FIG. 14 of the drawings.

The passage means 82 and 83 in element 78 communicate with chamber 86 formed therein which extends through the lower end of element 78 as shown in FIG. 14. A sub 88 is threadedly connected to the element 78 as shown in FIG. 14 and is provided with passage means 89 and 90 which communicate with the chamber 86 in the lower end of the element 78 and also communicate with the chamber 91 formed in the pressure recorder housing referred to generally by the numeral 43, the pressure recorder being supported in the chamber 91 in any suitable manner such as that illustrated in FIG. 14 of the drawings.

One suitable means of supporting the pressure recorder 44 within the housing 43 is to provide a receptacle 94 within which the pressure recorder element 44 is seated, the receptacle 44 being provided with a plurality of longitudinally extending and circumferentially spaced slots 96 for communication of fluid from the bore 98 extending through the lower end of the pressure recorder housing 43 with the chamber 91 formed in the pressure recorder housing 43. The pressure recorder housing 43 is threadedly connected at its lower end to the sub 102 which in turn is threadedly connected at its lower end to the pumping unit generally referred to by the numeral 45 and shown in greater detail in FIGS. 15, 16, and 16A. It will be noted that the bore 98 extending through the lower end of the pressure recorder housing 43 communicates with the bore of the hollow mandrel 110 as shown at the upper end of FIG. 15.

The sub 102 is shown as being threadedly connected at 103 to the member 104 which in turn is threadedly engaged at 105 to the clutch member 106 which is provided with two circumferentially extending grooves 107 diametrically opposed to each other, better seen in FIG. 37, but one of such grooves is partly shown in FIG. 15 thereby forming two projections 108 on the clutch member 106 which extend circumferentially between the grooves 107 and diametrically opposed to each other. A portion of one of such extensions 108 is shown in FIG. 15, the other being identical therewith.

Port means 104a are provided in the extension 104 for communicating well bore fluid to the chamber 104b for observing the position of the equalizing piston after the tool has been run in the well and then removed. If the piston is down, this indicates it needs more lubricating oil in the crankcase of the pump for lubrication of the pump parts and equalizing pressure as will be described.

The sub 102 is threadedly connected as shown at 102a to a longitudinally extending mandrel 110 which extends through the pumping unit as shown in FIGS. 15, 16, 16A, and terminates in the upper part of FIG. 17.

It will be noted that the mandrel 110 and the extension 104 are spaced radially by means of their threaded connection with the sub 102 as illustrated in FIG. 15 to form the chamber 104b previously referred to.

Mounted within the chamber 104b is an equalizing piston arrangement generally referred to by the numeral 115 whereby the fluid pressure in the annulus of the well bore and the oil pressure existing in the crank case end of the pumping unit may be substantially equalized to avoid damage to the pump parts. The equalizing piston arrangement includes the element 116 which is seated on its lower end 117 on the upper end of clutch member 106 as shown at 118. The element 116 is threadedly connected as shown at 119 to an extension 120 which extends through the clutch member 106, then through the clutch member 125 to be subsequently described, the outer housing 126, and into the sub 127 and is threadedly connected at its lower end as shown at 128 to the rotatable cam element 129.

The element 116 is provided with a radial extension 116a on its inner periphery which on its lower side abuts the upper end of extension 120 as shown in FIG. 15 and which at its upper end abuts the spring retainer housing 130, the spring retainer housing being connected to the element 116 by suitable means such as threads as represented 130a.

The spring retainer housing is provided with port means 130b for communicating fluid through the ports 104a and chamber 104b to the interior of the spring retainer housing.

A spring 132 abuts the upper end of the spring retainer housing 130 as shown in FIG. 15, and at its lower end rests on sliding piston 134, which piston surrounds the mandrel 110 as shown in FIG. 15 and abuts the radial extension 116A. Suitable seal means as shown at 134a are provided between the sliding piston 134 and the mandrel 110 to inhibit leakage of fluid therebetween. A seal means 116b is provided in the radial extension 116a and seals with the ungrooved portion 134b formed on the external periphery of sliding piston 134.

On each side of the ungrooved portion 134b of sliding piston 134 there are formed grooves 133 at the upper end and grooves 133a at the lower end, such grooves being circumferentially arranged on the sliding piston 134. The extension 120 is provided with a counterbore 120a which terminates at 120b in spaced relation to the lower end 134c of the sliding piston 134, to thereby provide for longitudinal movement of the piston 134 in order that the fluid pressure existing in the well annulus surrounding the tool and which acts on the top of piston 134 and equalizes with the oil pressure in the crankcase end of the pumping unit acting on the lower end 134c of the sliding piston 134. The crankcase of the pumping unit is filled with oil as the tool is assembled; however for purpose of clarity the oil is not shown in the drawings. The extension 120 is spaced from the mandrel 110 in order to provide a passage 120c which terminates within the pumping unit as shown at 120d in FIG. 16A. Suitable seal means abut and surround mandrel 110 immediately below the termination 120d to prevent leakage of oil from the crankcase of the pumping unit 45, as illustrated in FIG. 16A. In FIG. 34, a plug P is provided which communicates with the crankcase of the pump whereby it may be filled.

The clutch member 106 is provided with longitudinally extending keyways 106b formed in circumferentially extending portions 108 and extend longitudinally therethrough as better shown in FIG. 37. The extension 120 is provided with circumferentially spaced and longitudinally extending keys 120e for fitting in the keyways 106b of the clutch member 106. The keys 120e are diametrically opposed, as are the keyways 106b as shown in FIG. 37. The circumferentially extending portions 125b are each provided at one end with lugs 125a, such lugs being positioned adjacent the upper edge 125d of each circumferentially extending portion 125d as better seen in FIGS. 15 and 38. The lugs 125a engage against keys 120e during inflation of the packers, making a flow test, and while taking a shut-in pressure reading, all to be described hereinafter, and thereby prevent clutch members 106 and 125 from engaging during such operations. At such times, the lower edges 108a of portions 108 are in opposed relation to edges 125d of portions 125b.

The clutch member 125 is spaced longitudinally relative to the clutch member 106 as illustrated in FIG. 15, and in the position illustrated in FIG. 15, it will be noted that the circumferential extensions 108 on clutch member 106 are in alignment with the circumferential extensions 125b formed on the clutch member 125, two of such circumferential extensions 125b being as shown, thereby providing circumferential slots therebetween represented at 125c, and these are in alignment with the slots 107 of clutch member 106 when the tool is in the position illustrated in FIG. 15 of the drawings. The lower end of the clutch member 125 is provided with a counterbore 125d' for receiving the spring 125e therein to retain the splined arrangement 125f formed on the lower end of clutch member 125 in spaced relation relative to the splined arrangement 125g formed in sub 127. It will be noted that the sub 127 is provided with a counterbore 127a in which the splined arrangement 125g is formed and that the spring 125e abuts at its upper end against the lower end of clutch member 125 within counterbore 125d and rests on the shoulder 127b of the sub 127. Suitable port means 127c are provided to enable the escape of any fluid when the splined arrangements 125f and 125g are engaged as will be described hereinafter. Suitable seals as shown at 127d in FIGS. 15 and 16 are provided between the sub 127 and the extension 120 to inhibit the passage of well fluid into the crankcase end of the pumping unit. The sub 127 is threadedly connected at 140 to the sub 141 which in turn is connected at 142 to the sub 143.

The subs 127, 141, and 143 provide a housing for receiving the movable parts of the pump. The pump is actuated by rotation of the tubular member 42 to the right as in normal drilling operations, such rotation being imparted in turn to the cam element 129 shown in FIG. 16 by reason of the splined connection 61 and 62 shown in FIG. 13 which serves to rotate the housing 63, sub 69, housing 80, element 78, element 88, pressure recorder housing 43, sub 102, and extension 103 which in turn by reason of the keyways 106b in clutch member 106 and keys 120e and lugs 125a in clutch member 125 maintain the clutch members 106 and 125 in alignment so that projections 108 and 125b are opposed to each other. Thus these named elements rotate as does equalizing piston arrangement 115 and extension 120. The mandrel 110 also rotates since it is threadedly connected to sub 102 as shown in FIG. 15.

By reason of the foregoing arrangement, when rotation is imparted to the tubular member 42 such as drill pipe or the like, rotation is in turn imparted to the cam element 129. The remaining parts of the tool, including housing 126, sub 127, sub 141, sub 143, sub 192, sub 193, screen section 46, sub 247 and the packer elements 47 and 48 are restrained against rotation by the spring section means 51 as will be described in greater detail hereinafter. It will be noted that the cam element 129 is rotatably supported in the sub 127 by means of the bearing race 145.

FIG. 16 may be considered in conjunction with FIGS. 35 and 36 for a more complete understanding of the construction of the preferred embodiment of the pumping arrangement described in conjunction with the present invention wherein like numerals identify like parts. The cam element 129, as previously noted, is threadedly secured to the lower end of extension 120 as indicated at 128 in FIG. 16, and suitable bearing surface means as indicated at 147 may be provided between the extension 120 and the sub 127 which abuts the top of the bearing race 145 as shown in the drawings.

The cam element 129 is provided with a bore 129a through which extends the mandrel 110 as seen in FIG. 16. Suitable clearance is thus provided so that the cam element 129 and pistons associated therewith do not contact the mandrel during rotation of the cam element 129 in reciprocating the pistons.

As illustrated in the drawings, the cam element 129 is provided with a groove 150 on its exterior surface which extends circumferentially about the extension 151 of the cam element 129, such groove sloping downwardly from its uppermost point represented at 152 on the extension 151 as best seen in FIG. 16, to its lowermost point represented at 153 and as better seen in FIG. 35 of the drawings. The lowermost end of the extension 151 is formed as illustrated at 154 in FIGS. 16 and 35 so that such surface along with the side walls 155 and 156 of the groove 150 form a guide means for reciprocating the pistons 160 vertically as the cam element 129 is rotated.

In the embodiment illustrated, four pistons are mounted on the cam element 129 as represented by the numeral 160 in FIG. 36 of the drawings. The details of construction of the pistons 160 is better shown in FIGS. 16 and 35 and will be described in greater detail hereinafter. It should be noted that the pistons 160 are circumferentially spaced at 90 degree intervals on the cam element 129 and the pistons which are 180 degrees apart are balanced, that is, one moves up the same amount that the other moves down. The relationship of the pistons 160 is best shown in FIG. 36.

Each piston 160 includes an extension 162 at the upper end of which there is a round projection 163 which extends inwardly into the groove 150. A bronze or other suitable type bearing surface 164, shown in FIG. 16, is rotatably mounted on each projection 163 so that it rotates around the projection 163 as the cam element 129 is rotated, and such bearing surface and projection 163 are maintained within the groove 150 upon rotation of the cam element 129. Each piston 160 also includes a projection 162' which is spaced from and shorter than the projection 162 as shown in FIG. 16 of the drawings. It will be noted that the projection 162' is spaced from the bottom surface 154 of the cam element 129 as shown in FIG. 16, and a pin 168 extends through the projection 162 and 162' as shown in FIG. 16 and in FIG. 36. Mounted on each pin 168 is a roller bearing 170 as shown in FIGS. 16 and 36 for engaging the bottom surface 154 on projection 151 of cam element 129 upon reciprocation of the pistons.

The pistons referrd to generally by the numeral 160 also includes a cylindrical plunger portion 160a which is integrally formed with the extension 162 and 162' and adapted to be reciprocated within four bores 160b formed within the sub 141 as shown in FIG. 16 and better illustrated in FIG. 34. The bores are represented in dotted lines in FIG. 36 of the drawings.

Enlarged bores 160c are formed in the sub 141 in FIG. 35 and FIG. 36 for receiving the projections 162 and 162'. The enlarged bores 160c communicate with the bores 160b at their lower ends as shown in FIG. 35 of the drawings and the enlarged bores 160c terminate at their upper ends at 160d as shown in FIG. 35. Extending upwardly from the point of termination of the enlarged bores 160c of the sub 141 are four circumferentially spaced projections 160e, three of which are partially represented in FIG. 35. The side surface 162a represented in FIGS. 16 and 35 of each of the projections 162 of the pistons 160 are shaped to fit the vertical edge surfaces of each of the projections 160e whereby the projections or extensions 160e serve as a guide means for the pistons 160 as they move vertically. It will be noted that the projections 160e extend upwardly and abut the bearing 148 as shown in FIG. 16 and in FIG. 35. The side surfaces 162a of the projections 162' are also shaped to fit within the enlarged bores 160c.

Each bore 160b in the sub 141 communicates at its lower end with a bore 160g and a second bore 160h as better illustrated in FIG. 34.

FIG. 16A is a sectional view on the line 16A—16A of FIG. 34 and on the right-hand side shows in sectional view one inlet bore 160g which communicates with its respective piston bore 160b thereabove and on the left-hand side of FIG. 16A there is shown an outlet bore 160h which communicates with its respective piston bore 160b thereabove. Each of the bores 160g serves as a means for conducting inlet fluid to one of the piston bores 160b, and each of the bores 160h serves as a means of discharging fluid from one of the piston bores 160b under pressure. Thus, each piston plunger 160a is provided with a means for bringing fluid into the piston bore 160b when the piston plunger 160a is moved upwardly therein, and each piston bore 160b is provided for a means for discharging fluid under pressure therefrom through the outlet bore 160*h* on downward movement of the piston plunger 160*a* within the piston bore 160*b*.

The arrangement of a check valve means in the bore 160*g* and a check valve means in the bore 160*h* is shown in FIG. 16A which is a sectional view, as previously noted, on the line 16A—16A of FIG. 34. Also, the bore 160*g* includes a plunger arrangement so that when the discharge pressure of the pump to inflate the inflatable elements exceeds approximately 1500 to 1800 pounds per square inch over the static pressure in the well annulus which is supplying fluid to the inlet bores 160*g* of the pump, the inlet check valve means is unseated so as to prevent further increase of fluid pressure on the discharge end of the pump to the inflatable elements.

Referring to FIG. 34, it can be appreciated that each inlet bore 160*g* contains a check valve means on the inlet side of the pump, such check valve means being shown in FIG. 16A and represented generally by the numeral 176, and each bore 160*h* includes a check valve means represented generally by the numeral 178 in FIG. 16A.

In order to more fully explain the operation of the pump, reference is first made to FIG. 17 wherein the screen section generally referred to by the numeral 46 is shown at the lower portion of the figure. As described herein, the pump receives fluid from the well bore; however, it can be appreciated that a reservoir could be provided in the tool or tubular member for supplying fluid to the pump. This screen section is of suitable length, and the openings 46*a* therein are of suitable size to screen the fluid from the well bore annulus to inhibit the passage of undesired size sediment, or particles therethrough and into the pump. The screen section may be of any suitable length depending upon the size of the tool, and one suitable length may vary between six to eight feet and the size of the openings may be, for example, in the neighborhood of .040 inch. The screen section includes an inner section 46*b* to which the outer screen 46*c* is mounted by any suitable means such as screws or the like as represented at 46*e*. The inner section 46*b* is provided with port means 46*g* whereby fluid after passage through the openings 46*a* in the screen 46*c* is conducted into the passage 190 formed between 46*b* and the sleeve element 191. Inner section 46*b* is threadedly connected to sub 192 which in turn is connected to the next adjacent sub 193, and passage means 190 extends upwardly through the sub 192 and the sub 193 for conducting fluid from the annulus of the well bore to the inlet bores 160*g* of the pump when the cam element 129 is rotated as described hereinabove.

A port 194 in housing 143 communicates with annular space 195 surrounding mandrel 110 whereby fluid from passage 190 is conducted to such annular space. Thereupon, the fluid from the annulus is conducted up around the mandrel through passage 196 formed between the mandrel and the sleeve valve referred to generally by the numeral 200 which surrounds the mandrel as shown at the upper end of FIG. 17 and terminates at 201. The mandrel 110 is provided with grooves 110*a* on its outer periphery and communicates the fluid from passage 196 around the seal means 202 mounted in the radial and inwardly extending projection 200*b* on the inner periphery of the sleeve valve 200 as shown in FIG. 17.

Reference is now made to FIG. 16A wherein the grooves 110*a* communicate with the passage 143*a* formed in sub 143 as shown in FIG. 16A. A port 143*b* in sub 143 communicates fluid from passage 143*a* to the interior of bore 160*g* whereby fluid from the well annulus is conducted to the inlet check valve means 176. The inlet check valve means is of any suitable form such as a spring loaded check valve as shown in FIG. 16A, and when cam actuator 129 is rotated so as to move the plunger portion 160*a* of the pistons 160 upwardly, fluid is drawn into the plunger bore 160*b* by unseating inlet check valves 176.

By comparing FIG. 34 with FIG. 16A, it can be seen that on the down stroke of the plunger portion 160*a* of each piston within the piston bore 160*b*, the fluid from the annulus of the well bore is forced against the outlet check valves referred to generally at 178 in outlet bore 160*h*. The outlet check valves 178 are of any suitable form such as the spring loaded type as illustrated in FIG. 16A. The fluid from the outlet or discharge bore 160*h* flows through the opening 205 formed in nut 206 which is threaded in the lower end of bore 160*h* to retain the sleeve 207 in position against the check valve 178 to retain it in position, and from the port 205 the fluid is discharged into the annular space 208 which surrounds fitting 209.

The fitting 209 is seated on the shoulder 210 formed in the sub 143, and the fitting 209 is provided with suitable seal means 211 and 212 for preventing fluid leakage from the annular space 208.

The fluid from the pump is discharged from the annular space 208 through passage 213 formed in fitting 143 which communicates at its lower end with the master check valve represented by the numeral 215 shown adjacent the upper end of FIG. 17. The master check valve is any suitable spring loaded type such as that illustrated in FIG. 33 of the drawings and is positioned in a passage 216 and held on its seat by a spring 217. A plug 218 retains the check valve in position and prevents backflow of fluid from the port 220 to the passage 213 as illustrated in FIGS. 33 and 17. The port 220 in sub 143 communicates with a set of longitudinally extending and circumferentially spaced grooves 200*a* formed in the outer periphery of the sliding sleeve valve 200 as shown in FIGS. 17 and 33. This arrangement defines an annular space 200*b* better seen in FIG. 33 of the drawings whereby fluid from the discharge end of the pump is then conducted through the two passages 225 and 226 for inflation of the packer elements.

Attention is directed to FIGS. 32 and 33 in conjunction with FIG. 17 of the drawings to illustrate and understand the flow of fluid through the passages 225 and 226, it being understood that FIG. 17 is a sectional view taken on the line 17—17 of FIG. 32; and, therefore, passage 226 does not appear in FIG. 17 of the drawings. The discharge from the pump continues through passages 225 and 226 and discharges out the lower end into the annular passage 227*b* formed between fitting 227 and the fitting 228 which abuts sub 143 at its lower end and is provided with seals as illustrated at 229 for inhibiting leakage of fluid therebetween. The fitting 227 also telescopically receives the lower end of mandrel 110 as shown in FIG. 17 of the drawings.

Fluid is discharged from annular space or passage 227 through the annular bore 230 formed in fitting 228. Fitting 227 is provided with circumferentially spaced slots 231, and fluid from the bore 230 is discharged into the slots or grooves 231 formed on the exterior of fitting 227 from which it is discharged into the annular space 232 surrounding the hollow tubular extension 233 which telescopically fits up into the element 227, the fitting 227 having a bore 234 therethrough. This relationship is best shown in FIG. 17. Suitable seal means as illustrated at 235 are provided for sealing between the extension 233 and the fitting 227 to inhibit fluid leakage therebetween. The extension 233 is provided with a lug 236 which seats on the tapered shoulder 237 to aid in positioning the extension 233 within the tool; however, such lug does not interfere with the discharge of fluid from the annular space 232 through the passage 240 formed between the extension 233 and the element 191.

The fluid continues through passage 240 between sleeve element 191 and extension 233 as illustrated at the upper end of FIG. 18 and is discharged through the ports 241 formed in the lower end of sleeve element 191 into the annular space 242 beneath element 191 and surrounding extension 233. The fluid is then discharged into annular space 242 surrounding the lower end of extension 233 which is seated on the shoulder 243 of the fitting referred to generally by the numeral 244. A passage 245 formed in the fitting 244 communicates with the annular space 242 for conducting fluid from such annular space. The fitting 244 is surrounded by a sub 247 which is threadedly engaged at its upper end to 46b and threadedly secured at its lower end to the upper part of the upper packer section generally referred to by the numeral 47 as shown in FIG. 18.

Passages 248 formed between the fitting 244 and the sub 247 communicates with the passage means 245 formed in the fitting 244 and conducts the fluid to the annular space 249. By referring to FIG. 30, it can be seen that there are several passages 245 formed in the fitting 244 which communicate with the upper end of passage 248 formed between the fitting 244 and sub 247 which communicate fluid to the annular space 249 shown in FIG. 18. From the annular space 249 fluid is conducted through the passages 250 formed in sub 251 to the interior of the upper inflatable packer section generally referred to by the numeral 47 by discharging the fluid from the passage 250 to the interior of the inflatable element generally referred to by the numeral 252.

It will be noted that the inflatable element includes the packer head 253, such head serving to retain an annular reinforcing sheath referred to by the numeral 254 in position surrounding an inner tube 255, the reinforcing being held in position between the head 253 and the wedge shaped members 256 and the inflatable packer being provided with an external covering of resilient material 257. The fluid is discharged from the passage 250 to the interior of the inflatable element 252 to the space 258 interiorly of the inner tube 255. An extension 260 is telescopically received within the first counterbore 261 of the fitting 244 and is threadedly connected as illustrated at 262 to the sub 251. If desired, suitable means such as grooves circumferentially spaced as represented by the numeral 265 may be provided in the external periphery of the extension 260 to provide additional space for receiving fluid for inflation of the inflatable element 252. The lower end of the upper packer section 47 is continued at the top of FIG. 19, and it will be noted that the external resilient coating 257 extends longitudinally of the inflatable element 252 between the upper and lower packer heads 253, as does the surrounding reinforcing sheath 254 and the inner tube 255.

A head 253 similar to the upper head 253 is provided as are wedge members 256 for aiding in retaining the reinforcing 254 in position during inflation of the inflatable element. The circumferentially spaced and longitudinally extending grooves 265 in the extension 260 discharge fluid through the sub 270 threadedly connected to the end of the lower head 251 by means of the passage 271 whereupon it flows to the annular space 272 formed in the extension 273 and thence through the passage means 274 formed therein as shown in FIG. 19 and in the end of FIG. 20.

A sub 276 is threadedly connected to the extension 273 as shown in FIG. 20, and an annular space 277 is formed therein between the sub 276 and the hollow tubular extension 278, the tubular extension 278 being radially spaced to form such passage 277 whereby fluid from the passage 274 in the extension 273 is conducted downwardly therethrough and into the annular space 280 formed between the outer housing 281 and the tubular extension 278. The sub 276, housing 281, and sub 282 may be considered the variable spacing referred to generally by the numeral 49 in FIGS. 1 through 12.

The outer housing 281 is threadedly connected at its lower end to the sub 282 which is radially spaced relative to the tubular extension 278 to form a continuation of the passage means 280 for conducting fluid to the next packer section generally referred to by the numeral 48 in FIG. 22 of the drawings. The sub 282 is threadedly connected at its lower end to the port sub represented generally by the numeral 50 as shown in FIG. 21 of the drawings. The tubular extension 278 is telescopically received within the fitting 285 which is in the lower end of the passage 280 as illustrated in FIG. 21 of the drawings, there being suitable seal means between the fitting 285 and tubular extension 278 to inhibit fluid leakage therebetween.

Passage means 286 are formed in the fitting 285 for conducting fluid from the annular space 280 through the fitting 285 into the annular space 287 in port sub 50. The fitting 285 is positioned in the sub 282 by any suitable means, and as illustrated, a snap ring 290 in groove 291 at the lower end of the sub 282 is provided upon which the fitting 285 is seated, there being a counterbore 292 in the lower end of the fitting whereby the passage means 286 may communicate with the annular space 287 in the port sub 50 as shown in FIG. 21 of the drawings. A fitting referred to generally at 293 extends through the port sub 50 and is telescopically received at its upper end within the second counterbore 294 and third counterbore 295 of the fitting 285. Suitable seal means are provided to seal between the second counterbore and the portion of the fitting 293 received therein, and also suitable seal means are provided in the third counterbore to seal between such counterbore and the portion of the fitting 293 telescopically received therein as shown in FIG. 21 of the drawings. The fitting 293 extends concentrically through the port sub 50 as shown in FIGS. 21 and 27 of the drawings and terminates within the fitting referred to generally by the numeral 300. The fitting 300 is provided with a first counterbore 301 and a second counterbore 302 to telescopically receive the extensions 303 and 304, respectively, of the fitting 293. The port sub 50 is provided with passages 50a which communicate with the annular space 287 for conducting inflating fluid therefrom to the passages 306 formed between the port sub 50 and the fitting 293 as shown at the lower end of FIG. 21. The fitting 293 is seated on the upper end of fitting 300 as shown at the lower end of FIG. 21 and top of FIG. 22, and passage means 310 are formed in the remainder of the port sub 50 to conduct the fluid into the annular space 311 beneath fitting 300.

The fitting 300 is seated in the port sub 50 by means of the snap ring 312 seated within the groove 313 formed in the lower end of the port sub 50 as shown in FIG. 22. The annular space 311 is formed by counterboring the lower end of the port sub 50 and by counterboring the lower end of the fitting 300 until such counterbores intersect the passage means 310 to enable fluid to flow therefrom and into the annular space 311. Sub 315 is threadedly connected to the lower end of the port sub 50 as shown at the top of FIG. 22. The sub 315 has an internal bore 316 in which is received the fitting designated generally at 317. The fitting 317 is telescopically received within the lower end of the fitting 300 by reason of the counterbore 318 which receives the portion 319 of the fitting 317, and the smaller counterbore 320 that receives the portion 321 of the fitting 317. A plurality of circumferentially spaced and longitudinally extending grooves 325 communicate with the annular space 311 whereby fluid may be conducted through the grooves 325 of fitting 317 and through bore 316 of sub 315 to be discharged into annular space 327 and then into port means 328 in the upper end of the lower packer section 329, the lower packer section being generally referred to by the numeral 48 as previously mentioned.

The fitting 317 is supported within the fitting 300 and extends downwardly through the sub 315 as shown in FIG. 22 and is retained in position by means of the snap ring 330 which fits within the groove 331 formed in the lower end of sub 315 as shown in FIG. 22 of the drawings. The fitting 317 is reduced in diameter at its lower end as shown in FIG. 22 so that fluid may pass from grooves or passages 325 around the snap ring 330.

The construction of the lower packer element is identical to that previously described with regard to the upper packer section generally referred to as 47 and includes upper and lower packer heads 253, an inner tube 255, a reinforcing sheath, and an outer resilient cover. The inflatable elements 47 and 48 are of suitable length and the reinforcing sheath of metal, or other suitable material, extends longitudinally from one end to the other of the inflatable element and completely surrounds the inner tube both in deflated and expanded positions. Also the outer resilient covering extends from end to end and provides a means for seating or sealing against the well bore wall for isolating the zone or formation between the spaced elements 47 and 48 when they are inflated and engaged or seated against the well bore wall.

The passage 328 communicates interiorly of the inner tube 255 similar to the inner tube of the upper inflatable element previously described by means of the port 340 extending through the sub 329 of the lower packer element referred to generally at 48. A longitudinally extending tubular element 341 is threadedly engaged with the interior of the sub 329 and extends through the inflatable element as shown at the lower end of FIG. 22 and as shown in FIG. 23 and is threadedly connected at its lower end in the counterbore 344 of the sub 343. A plurality of longitudinally extending grooves 344a are provided at circumferentially spaced intervals on the longitudinally extending tubular member 341 to provide additional space for fluid communication interiorly of the inner tube 255.

The lower end of inflatable element 48 generally referred to by the numeral 48 is constructed similarly to the lower end of the upper inflatable packer element 47 shown at the top of FIG. 19. It is, therefore, believed that a description of such construction is unnecessary to a person skilled in the art. Such construction is described in detail with regard to FIGS. 18 and 19.

The sub 343 is provided with a bore 345, the bore 345 communicating with the enlarged counterbore 346 in the lower end of the sub 343 as shown at the top of FIG. 24. As shown in FIG. 24, the enlarged counterbore 346 has positioned therein the support 347 which carries the spring loaded flapper valve 348. The spring loaded flapper valve 348 is shown in open position which is its normal position when the tool is in assembled relationship as illustrated in the drawings. However, prior to assembly the spring loaded flapper valve 348 seats on the seat 347a to close off communication through bore 345, but when the tool 40 is assembled tubular element 501 extends downwardly through sub 343 and assumes the position shown in FIG. 24, so that the valve 48 is opened. The flapper valve prevents well fluid from entering the tool as the tool is assembled and lowered into the well at the wellhead. This allows the tool to be filled with clean fluid as it is assembled at the surface.

A sub 350 is threadedly secured to the lower end of sub 343 as shown, and a hollow extension 351 is threadedly connected to the lower end of the sub 350, the sub 350 having a bore therethrough for passage of fluid as will be described in greater detail hereinafter.

The spring section of the tool previously referred to by the numeral 51 in FIGS. 1 through 12, inclusive, is shown in the lower part of FIG. 24 and FIG. 25 and is shown as including a plurality of bowed spring 352 having their ends 353 and 354 received within recesses 355 and 356, respectively, formed in the outer periphery of the extension 351.

Suitable retainer means as illustrated at 360 are provided at each end of the extension 351 for engaging over the ends of the bowed spring members 352 to retain them in position on the extension 351.

Attention is directed to FIG. 26 wherein the recess 355 which extends circumferentially of the extension 351 is illustrated and the upper ends 353 of the bowed springs 352 are shown as being bent as illustrated at 353a in FIG. 26 for engaging within the recess 355.

It will be noted that a plurality of circumferentially spaced and longitudinally extending grooves 361 is provided adjacent each end of the extension 351, and a portion adjacent each end of each of the bowed spring members 352 extends within such grooves as illustrated in FIGS. 24, 25, and 26 to enable retainers 360 to fit snugly about the end portions of the springs within the grooves and aid in retaining them therein.

An end piece 370 is threadedly secured to the lower end of the extension 351 as shown in FIG. 25, such end piece having an opening 371 for communicating well fluid from the well annulus below the tool 40 to the interior thereof through the hollow extension 351.

The bow springs 352 of the portion 51 of the tool engage the well bore wall so that as the tubular member 42 is rotated to impart rotation to the cam element 29 in the manner as previously described, in order to pump fluid to inflate the inflatable packer elements, the portions of the tool hereinbefore designated will be held restrained against rotation to enable the cam element 129 to rotate in sub 127 and thereby operate the pistons 160 to pump fluid to inflatable elements 47 and 48 in a manner heretofore described.

As the packers are inflated to engage the well bore wall at a selected elevation within the well bore, the outer portions of the tool on which the inflatable elements are carried will move longitudinally relative to the internal parts of the tool and relative to the portion of the tool that is rotating to inflate the packer elements 47 and 48. For example, reference is made to FIG. 23 wherein it will be noted that the lower end of the packer element referred to generally by the numeral 48 is slidably and sealably supported on the extension 341 whereas the upper packer end of the upper packer element 47 is secured to the outer part of the tool 40 as shown in the lower portion of FIG. 18.

In order to accommodate longitudinal movement of the lower end of the upper packer element 47, the lower packer element 48 and the outer parts of the tool therebetween relative to the interior components of the tool, attention is directed to the arrangement shown in FIG. 19 along with the sectional view, FIG. 28, for accomplishing such function. The extension 260 which extends through the upper packer element 47 and is connected to sub 251 as shown in FIGS. 18 and 19 is provided with an arrangement to accommodate longitudinal movement between the extension 273 and extension 260 which is positioned internally of extension 273 as shown. Such arrangement includes lugs or keys 380 extending longitudinally of and secured to the lower end of the extension 260 which extends through the upper packer section 47 as shown in FIGS. 18 and 19 and is secured by the threads 262 to upper packer head 251 above the upper packer element 47. The lugs or keys 380 fit within the longitudinal slots 381 formed in the sleeve 274a as shown in FIGS. 28 and 19, and as the inflatable packer elements 47 and 48 expand radially, the extension 273 and the inflatable element 48, spacer 49, port sub 50 and lower end of upper packer element 47 move upwardly. The sleeve 274a is secured in position by any suitable means, and is shown in FIG. 19 as being seated on fitting 432. The lower packer element 48 moves longitudinally in a manner as previously described since its lower end is sealably and slidably supported on the extension 341 as shown in FIG. 23 of the drawings.

In order to inhibit rotation of the parts of the tool as the packers inflate and such parts move longitudinally, an arrangement is provided as illustrated in FIGS. 19 and 29 wherein a splined connection 390 is formed by providing circumferential grooves 391 extending circumferentially of the sleeve 274a which intermesh with grooves 392 formed on the sub 270.

After the tool has been lowered into the well bore to the desired elevation and the pipe 42 rotated at the earth's surface to begin the inflation of the packers, such inflation will continue until they engage the well bore wall and securely hold the tool in position at any desired elevation within the well bore.

It is desirable that the discharge pressure of the pump not exceed the static pressure existing in the well bore by 1500 to 1800 to p.s.i. and which static fluid pressure is conducted to the pump through the screen 46c previously described in FIG. 17. In order to maintain the pressure differential between the well annulus and the discharge of the pump within this range, suitable means as generally referred to by the numeral 400 are provided in the inlet bore 160g beneath the inlet check valve generally referred to by the numeral 176 as better illustrated in FIG. 16A. Such arrangement includes a plug 401 which is threadedly connected in the lower end of bore 160g and has an opening 402 therein. A sleeve 403 abuts the ported plug 401 at one end and abuts the lower end of the check valve 176 at its upper end to retain the check valve 176 in position. Within the sleeve 403, there is a plunger 404, the lower end of which extends through the sleeve 403 as shown in FIG. 16A, thereby exposing the lower end of the plunger to the discharge pressure of the pump in the annular passage 208. Suitable seals are provided to seal between the lower end of the plunger 404 and sleeve 403, as shown in FIG. 16A.

The plunger 404 is normally maintained in the position as shown in FIG. 16A by means of the spring 405, but when the pressure in the discharge annulus 208 from the pump acts on the lower end of the plunger 404 and exceeds the pressure of the well fluid in the annulus of the well bore approximately 1500 to 1800 p.s.i., it will act on the lower end of the plunger and move it upwardly so that its upper end engages the check valve 176 and unseats it. It will be noted that suitable means such as a nut 406 is threaded in sleeve 403 and is provided for guiding the plunger 404 vertically, and for adjusting the compression spring 405 to set the pressure at which check valve 176 unseats.

Thus, when the inlet check valve is unseated by engagement with the plunger 404, the reciprocation of the plunger portion 160a of each of the pistons 160 will discharge the fluid back out through the inlet check valve rather than discharging the fluid out through the discharge check valve 160h. This causes the pump to cease pumping fluid to the inflatable elements.

Reference is now made to FIGS. 1, 2, and 3 of the drawings wherein the upper, middle, and lower portions of the tool are schematically illustrated. Fluid is represented by the arrows 46i as entering the screen shown at 46c from the well bore annulus (not shown) and being conducted up through passage means previously described to the inlet check valve 176 upon proper movement of plunger portion 160a by reason of rotation of the cam element 129 as diagrammatically represented in FIG. 2 of the drawings. The fluid after passing inlet check valve means 176 is then shown as being discharged through the outlet check valve represented generally by the numeral 178 and past the master check valve referred to generally at 215 and then downwardly as represented by the arrows 420 for inflation of the upper and lower packer elements 47 and 48 as previously described.

As the upper and lower packer elements move radially outwardly to engage the wall of the well bore, the fluid trapped therebetween will pass through the port means 50b formed in the port sub 50 and through the port means 293a formed in the fitting 293 which communicate with the port means 50b as shown in FIG. 21.

As shown in FIGS. 21 and 27 of the drawings, the fitting 293 and the port sub are provided with a circumferential groove 50c adjacent the port means 50b and 293a to provide a means for communicating fluid between the fitting 293 and the port sub 50.

It will be noted that as the packers inflate, the arrows 421 in FIGS. 1, 2, and 3 represent fluid passing from the portion of the well bore being sealed off or isolated between the packer elements 47 and 48 as they inflate and through the port means 50b and 293a to the interior of the fitting 293 which has the longitudinally extending bore 293b therein, as shown in FIG. 21. By further reference to FIG. 21, the fluid is conducted from the bore 293b through the bore 285c in fitting 285 and into the hollow tubular element 430 which is telescopically received within the counterbore 431a of the fitting 285 as shown in FIG. 21. Suitable seal means are provided between the fitting 293 and fitting 285 and between the tubular member 430 and the fitting 285 to inhibit fluid leakage therebetween.

The fluid from the space between the inflating packers is then conducted upwardly through the tubular element 430 which is shown as terminating within the innermost bore or passage 436 of fitting 432 in FIG. 20. Suitable seal means are provided between the tubular element 430 and passage 436 in fitting 432 to inhibit fluid leakage therebetween. The fitting referred to generally at 432 is seated on the shoulder 433 of the extension 273 as shown at the lower end of FIG. 19, and the fitting 432 terminates at its upper end within the bore of sleeve 274a as represented generally by the numeral 435. The sleeve 274a is seated on the annular shoulder formed on fitting 432 as shown at the bottom of FIG. 19. It will be noted that the sleeve 274a telescopically receives the upper end of the fitting 432, and suitable seal means are provided therebetween to inhibit leakage as illustrated in FIG. 19.

It will be noted that the passage means 274 previously referred to is formed in the fitting 432 by reason of circumferentially spaced and longitudinally extending grooves represented by the numeral 432a on the outer periphery thereof. The outer edge of the fitting 432 in which the grooves are formed rests on the shoulder 273b of extension 273 as shown in FIG. 19.

Telescopically fitting within the bore 436 of fitting 432 at its upper end is the hollow tubular extension 437. Suitable seal means are provided between the bore 436 and the tubular extension 437 to inhibit leakage of fluid therebetween. The tubular extension 437 is shown in FIG. 19 and is telescopically received within the fitting 244 as shown in FIG. 18. Suitable seal means are provided between the fitting 244 and the hollow tubular extension 437 to inhibit leakage therebetween as shown in FIG. 18 of the drawings. The fitting 244 is provided with a bore 244b which communicates the bore 437a of the tubular extension 437 with the bore 233a of the tubular extension 233.

The bore 233a of the tubular extension 233 communicates with the bore 234 of element 227 and then with the internal bore of the hollow mandrel 110 as shown in FIG. 17. Suitable seal means are provided between the lower end of extension 233 and the fitting 244 as shown in FIG. 18, and suitable seal means are provided between element 227 and tubular extension 233 as shown at 235 to inhibit fluid leakage therebetween. The hollow mandrel 110 extends up through the pumping unit referred to generally by the numeral 45 and terminates within the sub 102 as shown in FIG. 15. The bore of the sub 102 communicates with the passage means 98 in pressure recorder housing 43 and with the grooves 96 in pressure recorder housing 43 which in turn communicate with the ports 89 and 90 and through the chamber 86 with the ports 82 and 83 and then to the annular passage 85. The fluid received into the tool through the port means 50b from the port sub is thus discharged through the ports 76a into the passage 74d formed in the lower piston of the hydraulic tool generally referred to by the numeral 41 in FIG. 1. By referring to FIGS. 14 and 1, it can be seen that the fluid from passage 74d in the lower piston 74 unseats check valve 74f, thereby permitting fluid to discharge through passage 74g as shown both in FIGS. 1 and 14 to be discharged above the uppermost packer section and into the well bore annulus through the port 80a formed in the element 78. As previously noted, the arrows 421 in FIGS. 1, 2, and 3 diagrammatically represent the discharge of fluid from the space between the packer elements 47 and 48 as they expand and seal against the well bore wall.

Suitable means are also provided whereby the fluid pressure in the well bore annulus below the lowermost packer element 48 of the tool 40 may be equalized with the pressure existing in the well bore above the uppermost packer element 47, such means forming a fluid flow passage through the tool for the passage of fluid in the manner described and represented generally by the arrows designated 500 in FIGS. 1 through 12 of the drawings.

One form of suitable means for accomplishing this flow passage within the testing and treating tool is illustrated, and reference is first made to FIG. 24 wherein a hollow tubular element 501 is illustrated as extending through sub 343 and the bore 346 therein. As the tool is assembled, the lower end of the hollow tubular element 501 will open the flap valve 348 to the position shown at the top of FIG. 24 of the drawings. The tubular element 501 extends upwardly in the tool through the sub 343 and through the lowermost packer section 48 as illustrated in FIGS. 23 and 22 to be threadedly engaged in fitting 317. The fitting 317 is provided with a bore 317a which divides off into two branches 317b and 317c at its upper end. These two passages in turn communicate through the fitting 300 by means of the passages 300a formed therein. Suitable seals are provided between fittings 300 and 293 to inhibit leakage of fluid as shown in FIG. 22. The lower end of fitting 293 terminates in spaced relationship relative to the fitting 300 as shown at the top of FIG. 22 forming an annular space 300d into which the fluid from the passages 300a discharges.

From the annular space 300d, the fluid is discharged through passage means 293c of fitting 293 positioned in port sub 50, and the upper end of fitting 293 is spaced relative to fitting 285 to form the annular space 293d, and the fluid is then discharged through passage means 285a extending through the fitting 285. The fluid is discharged out the upper end of the passage means 285a in the fitting 285 and through circumferentially spaced port means 278c formed in the lower end of tubular element 278 as shown in FIG. 21. It will be noted that tubular element 278 is radially spaced relative to the tubular element 430 by any suitable means such as lugs 278d shown in FIG. 20 which may be positioned between the tubular elements 278 and 430, respectively, and secured in position by any suitable means such as welding or the like. The lugs 278d are circumferentially spaced to enable the fluid to flow through the passage 278e formed between the hollow tubular elements 278 and 430 as shown in FIGS. 21 and 20. The fluid from beneath the lowermost packer section 47 communicates through passages 432b formed in the fitting 432, as better seen in FIG. 19 and FIG. 20 and the fluid communicates with the annular space 520 above the fitting 432 and from there it flows into the space or passage 521 formed between the tubular element 260 and the tubular element 437 as shown in FIG. 19 of the drawings. The fluid communicates from passage 521 into fitting 244 and then by passage 522 extending through the fitting 244 shown in FIG. 18 for communication out the port means 523 which communicates with the well bore annulus above the upper packer section 47, thus equalizing the pressure in the well bore annulus in which the tool is used above and below the upper and lower packer elements 47 and 48, respectively.

As previously noted, FIGS. 4, 5, and 6 are schematic illustrations of the tool diagrammatically illustrating the upper, middle, and lower portions of the tool, respectively, when it is in position for making a flow test after the inflatable packers have been inflated to seal against the well bore wall and thereby seal off the area to be tested or treated. In the description of the present invention, the tool will be described in connection first of all with what is termed in the art as making a flow test.

After the packers have been inflated to sealingly engage the well bore wall so that the tool is held in position in the well bore, the weight of the tubular members extending to the earth's surface may be set down whereupon the piston 66 shown in FIG. 13 moves down slowly in chamber 67 which is filled with liquid, and the liquid must move around the piston rings 69a on the outer periphery of the piston as shown in FIG. 13. As weight is set down on the tool, no rotation is applied to the tool, and the keys 61 move through keyways 62 of the housing 63 as shown in FIG. 13. Extension 65 moves piston 66 down and simultaneously move piston 74 down shown at the upper end of FIG. 14 until the upper end of piston 74 has cleared the ports 76a in sleeve 76. The check valve 74f prevents fluid pressure from the annulus in the well bore from entering the tool, and when the piston 74 has been lowered beneath the ports 76a, the ports 76a are then placed in communication with ports 73 formed in the hollow extension 72 of piston 74 which is engaged with the extension 65 by any suitable means such as threads or the like as shown in FIG. 14. Suitable seal means are provided for inhibiting leakage of fluid from the various passages as illustrated in the drawings.

The extension 65 is provided with a bore 65a which communicates with the bore 60a in sub 60 and then with the bore 42a of the tubular member 42 which is connected to sub 60, and when the tool is in this position, it is in the position illustrated in FIGS. 4, 5, and 6 of the drawings. By reason of the slow movement of the piston 66 as mentioned above, it may take five to ten minutes for the piston to move downwardly so as to align the ports 73 with the ports 76a, and when in this position, the zone of the well bore sealed off between the packers and represented generally by the numeral 550 in FIG. 6 discharges fluid into the port sub through the ports 50b as diagrammatically illustrated by the arrows 551 in FIGS. 4, 5, and 6 to the tubular member 42.

The fluid moves through the ports 50b of port sub 50, ports 293a, and bore 293b shown in FIG. 21 through the bore 285c of fitting 285, through the bore 431 of hollow tubular member 430, through bore 433 of fitting 432, through bore 437a of tubular extension 437 as shown in FIG. 19, through bore 244b, through bore 233a shown in FIG. 18, through bore 234 shown in FIG. 17, through the bore of the hollow mandrel 110, through the bore of sub 102, through passage 98 in pressure recorder housing 43, through grooves 96 into chamber 91, through passages 89 and 90, through passages 83 and 82, and into annular space 85 shown in FIG. 14, and then to the ports 76a which are in communication with the ports 73.

The tool is left in the relationship illustrated in FIGS. 4, 5, and 6 for a given or predetermined period of time depending upon conditions known to those persons skilled in the art, and after the predetermined lapse of time, the tubular member 42 is raised at the earth's surface so that the tool then assumes once again the position shown in FIGS. 1, 2, and 3 of the drawings.

When the tool has been returned to the position shown in FIGS. 1, 2 and 3, it is in the same position as illustrated in FIGS. 7, 8 and 9; and when in this position, the formation pressure existing in the zone sealed off between the packers in the annulus represented at 550 in FIG. 9 builds up to its natural formation pressure. The pressure recorder 44 in pressure recorder housing 43 makes a record of this pressure, and this is termed a "shut in pressure" test.

The pressure recorder 44 is of a well-known construction, and it is related to time so that it makes a pressure record as the tool is lowered into the hole. When the tool reaches the area or zone to be tested, the static pressure will be recorded on the pressure recorder, and the tool is left in the position shown in FIGS. 7, 8, and 9 for a predetermined period of time in order to determine if the natural formation pressure increases or decreases during the test time period.

During the step described with regard to FIGS. 4, 5, and 6 wherein a flow test was obtained to obtain a sample of the fluids from the zone sealed off between the packers in the well bore, the pressure recorder 44 also records the flowing pressure of the formation or zone 550 sealed off between the packers as such fluid flows around the pressure recorder 44 as shown in FIG. 14 of the drawings.

Generally speaking, more than one flow test and "shut in test" is taken, and it is not unusual for the drill pipe or tubular member to be opened to the formation for a flow test after the packers have been set in the well bore for a few minutes and then the tool manipulated to the position shown in FIGS. 7, 8, and 9 for an initial shut in pressure test.

Thereafter, the tool is again opened to the position described with regard to FIGS. 4, 5, and 6 for an additional flow period, and the flow period in this test may be longer than the initial flow period above mentioned. After the second flow test, the tool is closed by raising the hydraulic tool portion designated generally by the numeral 41 to the position shown in FIGS. 7, 8, and 9 for a second shut in pressure test. Of course, any number of flow tests and pressure shut in tests may be taken. Thereafter, when the tool is removed from the well bore the information obtained on the pressure recorder is correlated with formulas well known in the art to obtain information relative to the formation being tested between the inflated packers. After the desired number of flow tests and shut in tests have been accomplished, it is then desirable to discharge the fluid from within the packers so that they may return to the condition illustrated in FIGS. 18, 19, 22, and 23, which is their normal deflated position.

The relationship of the components of the invention to accomplish the deflating of the packers is illustrated in FIGS. 10, 11, and 12. To deflate the packers, weight is set down on tubular member 42 which is transmitted to the hydraulic tool portion designated generally by the numeral 41, but weight is not applied long enough for the pistons to move downwardly to open the port 50b to tubular member 42; however, such downward movement compresses spring 125e and the splined surface 125 of the lower end of clutch member 125 engages the splined surface 125g.

This locks lower clutch member 125 against rotation and then tubular member 42 is rotated at the earth's surface so that the upper clutch member 106 rotates with the tubular member 42 since the keys 120e are engaged in keyways 106b, as better seen in FIG. 37, and this causes projections 108 to fall into recesses 125c.

When this occurs, mandrel 110 moves down relative to the inflated elements as diagrammatically illustrated in FIGS. 10 and 11 of the drawings.

Reference is now made to FIG. 16A and the upper end of FIG. 17, there being shown in FIG. 16A an annular shoulder 110b on the outer periphery 110 of the mandrel which is movable longitudinally within the passage means 143A of the housing 141 as shown in FIGS. 16 and 16A. The downward movement of the mandrel 110 continues until it engages the upper edge 200b of the radially and inwardly extending projection of the sleeve valve 200 which is supported on the external surface or periphery of the mandrel 110 as shown at the top of FIG. 17.

The mandrel 110 moves longitudinally through the sleeve valve until the annular shoulder 110b, shown in FIG. 16A, strikes the upper edge 200b of the radial projection on the sleeve valve 200, which projection forms a receptacle for the seal means 202 previously identified. When the shoulder 110b of the mandrel strikes the upper edge 200b of the projection, the sleeve valve 200 is then moved downwardly within the bore 143a formed in the housing or sub 143 until the lower end 200c thereof engages the upper end 227a of the fitting 227 shown in FIG. 17. It will be noted that the sleeve valve 200 is provided on its exterior surface with a plurality of longitudinally extending and circumferentially spaced grooves represented at 200a' which terminate at their upper end immediately below seal means 200f which sealingly engage with the bore 143a and a second set of longitudinally extending and circumferentially spaced grooves 200d', the first set of grooves 200a' being spaced longitudinally from the grooves 200d' by the annular surface 200e formed on the outer periphery of the sleeve valve 200 as shown in FIG. 17.

When the sleeve valve 200 is seated on the upper end 227a of the element or fitting 227, it will be noted that the grooves 200a' span the seal means 143d positioned in the bore 143a whereby the passage means 225 in the fitting 143 may communicate with such grooves and with the opening 143f in the fitting or housing 143 whereby the fluid internally of the packers may be discharged to the well. Such communication from internally of each of the packers is accomplished by reason of the fact that the passage or groove 341 internally of the lower packer element, shown in the upper end of FIG. 23 communicates with the bore 340 shown in the lower end of FIG. 22 and then through passage 328 and through passage 325, through grooves 316, through passages 310 in port sub 50 as shown at the top of FIG. 22 and bottom of FIG. 21, through passages 306 in fitting 293, through passages 50a in port sub 50, then to annular space 287 and next through passage 286 in fitting 285, through passage 280 as shown in FIG. 21 and in FIG. 20, and then through passage 277 and passage means 274, through grooves 432a forming part of the passage designated 274 in housing 273, and then through passage means 271 as shown in FIG. 19, through groove passage means 265 internally of the upper packer as shown in FIG. 18, through passage means 250 to the annular passage 249, through passage means 248 and 245 of fitting 244, also shown in FIG. 18, through ports 241 and passage 240 shown at the upper end of FIG. 18 and at the lower end of FIG. 17, through slots 231, through bore 230 and into annular space 227b formed between fitting 227 and fitting 228 to communicate with passage means 225 formed in the housing 143, the passage means 225 communicating with the uppermost grooves 200a' on the sleeve valve 200 and these grooves span the seal means 143d when the sleeve valve has been shifted downwardly to thereby communicate with port 143f. Thus, fluid internally of the packers is communicated exteriorly of the packers through the port 143f formed in housing 143.

Also, it will be noted that the second or lowermost set of groove means 200d' spans the seal means 143g mounted in the bore 143 and surrounding the sleeve valve 200 when the sleeve valve has been lowered so that the annular space between the packers previously represented by 550 is communicated with the exterior of the well bore through the port 143f to thereby equalize the pressure in the annulus with the pressure in the annulus between the packers as they are deflating. Such communication is established since the port means 50b shown in FIG. 21 of the drawings communicates with the bore 293b by means of the ports 293a which in turn communicates the annular space between the packers through the bore 285c formed in the fitting 285 as shown in FIG. 21 and then passes through the bore 431 of the tubular element 430 shown in FIG. 21 and continues upwardly through the bore 436 as shown at the upper end of FIG. 20, and then continues through the bore 437a of the tubular element 437 as shown in FIG. 19, then passes through bore 244b of fitting 244, and then through bore 233a shown at the upper end of FIG. 18 and into bore 234 of the fitting 227 shown in FIG. 17.

The fluid from the space between the packers then flows through the port means 234c formed in the fitting 228 and into the passages shown in dotted line and represented by the numeral 227d and then into annular recess 143h formed in fitting 143. When the sleeve valve has been lowered as previously described, the annular space 143h communicates with the grooves 200d', and these grooves in turn span the seal means 143g to communicate with the port 143f to thereby enable the space 550 between the packers to communicate with the well and equalize with the pressure existing in the well bore annulus above the packers at the time that the packers are being deflated.

The passage means shown in dotted line and represented by the numeral 227d in FIG. 17 are more clearly seen in the sectional view in FIG. 32, and it will be noted that there is a plurality of such passages which extends longitudinally of and are circumferentially spaced in the sub 143.

In FIG. 31 which is a sectional view taken on the line 31—31 of FIG. 18, a shear pin relief valve represented generally by the numeral 600 is shown as being mounted in the sub 247. If the screen section represented generally by the numeral 46 of the well tool becomes plugged, the well fluid pressure in the annulus of the well bore acting through the passage 601 of the sub 247 acts on the valve member 602 and shears pin 603, thereby enabling the valve element 602 to unseat so that well fluid from the annulus may pass through the passage 601 which communicates through the bore 603, shown at the top of FIG. 18, with the passage 190 so that fluid may be passed directly to the pump and thereby bypass the screen section 46.

After the packers have deflated, the weight of the tool will generally cause it to assume a relationship relative to the tubular member as shown in FIG. 13.

The lower end 200c of the sleeve valve 200 is provided with a plurality of circumferentially spaced recesses 200c' as seen in FIG. 17, and when rotation is imparted to the tubular member, fluid will be pumped through the recesses 200c' and into passage means 196 between mandrel 110 and sleeve valve 200. Since the fluid cannot pass seals 202, the fluid will pump the sleeve valve along mandrel 110 until it assumes the position shown in FIG. 17, whereupon the fluid will then be conducted to the inlet of the pump for subsequent discharge to inflate the inflatable elements or packers.

Thus, the present invention provides a tool that can be set and released as many times as desirable without removing it from the well after each setting.

Additional reference should be made to the clutch means employed in the present invention. The clutch lugs 125a on lower clutch member 125 in co-operation with key 120e serves to maintain clutch member 106 and clutch member 125 aligned so that when weight is set down on the tool, the edges 108a of circumferential projections 108 will strike the edges 125d of circumferential projections 125d. Similarly, when rotation is imparted to the tubular member without setting weight thereon, the lugs 125a engage the keys 120e and maintain the clutch members 106 and 125 in the above described relationship.

Only when weight is set down and the splines 125f and 125g engage and rotation imparted to the tubular member and tool will the clutch members align so that projections 108 fall in recesses 125c.

The upper piston 66 in the hydraulic tool 41 shown in FIG. 13 moves up rapidly relative to its downward travel, by reason of the valve arrangement referred to generally by the number 69c. A ring 69e is locked on extension 65 in spaced relation to the bottom of piston 66 as shown in FIG. 13. The ring 69e may be locked in such position by any suitable means such as the nut 69f threaded through opening 69g in ring 69e to abut the extension 65 and thereby lock the ring 69c in position. A plurality of openings 69i is circumferentially spaced in the upper edge of ring 69c as shown and in each opening there is provided a spring 69j. The springs 69j abut pins 69k which in turn abut annular valve element 69l which surrounds extension 65.

The piston 66 is provided with a plurality of passages 69d extending therethrough, and when the piston 66 is moved upwardly in chamber 69, fluid may flow through these passages and unseat the annular valve element 69l to permit escape of the fluid from the top of the piston through the piston more rapidly than the fluid can move around the piston on an upstroke.

The present invention has been described as including spaced inflatable element; however, it can be appreciated that one element can be used to perform similar functions.

What is claimed is:

1. In a well tool adapted to be lowered on a tubular member into a well for isolating at least one zone in the well, the invention including:
   (a) a pressure recorder supported by the tool for recording fluid pressure in the zone to be isolated;
   (b) spaced inflatable elements carried by the tool;
   (c) pump means connected with the tool and operable upon rotation of the tubular member to pump fluid into said inflatable elements to sealingly engage them against the wall of the well and thereby isolate at least one zone in the well;
   (d) check valve means connected with the tool to relieve any fluid pressure in the zone between said spaced elements as they inflate;
   (e) there being passage means in the tool communicating the well below the lowermost inflatable element with the well above the uppermost inflatable element to substantially equalize the pressure in the well above and below the tool;
   (f) there being additional passage means in the tool that communicates with the well in the isolated zone; and
   (g) means for opening the additional passage means that communicates with the well in the isolated zone to the tubular member on which the tool is supported for instrumentally testing the isolated zone and recording the fluid pressure by said recorder means.

2. The invention of claim 1 wherein said pump means includes an unloading valve arrangement so that said pump will cease pumping when the discharge pressure of the fluid from said pump exceeds the pressure of the fluid in the well adjacent the location of the tool in the well by a predetermined amount.

3. The invention of claim 1 wherein said inflatable elements include reinforcing from end to end to withstand the pressures encountered in the well.

4. The invention of claim 1 wherein said means that opens the additional passage means to communicate the isolated zone to the tubular member includes piston means which is operable when weight is set down on the tubular member and the tool to open the additional passage means for communication between the isolated zone and the tubular member.

5. In a well tool adapted to be lowered on a tubular member into a well wherein spaced inflatable elements are carried on the tool, the invention including:
   (a) pump means connected with the tool and operable upon rotation of the tubular member to pump fluid from the well to the inflatable elements and inflate them to sealingly engage the wall of the well and isolate a zone therebetween; and
   (b) means forming a part of the tool to relieve fluid pressure in the isolated zone between said spaced elements as they inflate.

6. The invention of claim 5 wherein said pump means includes an unloading valve arrangement so that said pump will cease pumping when the discharge pressure of the fluid from said pump exceeds the pressure of the fluid in the well adjacent the location of the tool in the well by a predetermined amount.

7. In a well tool adapted to be lowered on a tubular member into a well wherein spaced inflatable elements are carried on the tool, the invention including:
   (a) pump means connected with the tool and operable upon rotation of the tubular member to pump fluid from the well to the inflatable elements and inflate them to sealingly engage the wall of the well and isolate a zone therebetween; and (b) means to communicate the interior of the elements with the well to deflate them, said means including passage means to equalize the pressure in the isolated zone with the well as the elements deflate.

8. In a well tool adapted to be lowered on a tubular member into a well for isolating at least one zone in the well:
 (a) a pressure recorder supported by the tool for recording fluid pressures in the zone to be isolated;
 (b) at least one inflatable element carried by the tool;
 (c) pump means connected with the tool and operable upon rotation of the tubular member to pump fluid into said inflatable element to sealingly engage it against the wall of the well and thereby isolate a zone in the well;
 (d) check valve means connected with the tool to relieve any fluid pressure in the zone being isolated as said element inflates;
 (e) there being passage means in the tool that communicates with the well in the isolated zone; and
 (f) means for opening the passage means that communicates with the well in the isolated zone to the tubular member on which the tool is supported for instrumentally testing the isolated zone and recording the fluid pressure by said recorder means.

9. The invention of claim 8 wherein said pump means includes an unloading valve arrangement so that said pump will cease pumping when the discharge pressure of the fluid from said pump exceeds the pressure of the fluid in the well adjacent the location of the tool in the well by a predetermined amount.

10. The invention of claim 8 wherein the inflatable element includes reinforcing from end to end to withstand the pressures encountered in the well.

11. In a well tool adapted to be lowered on a tubular member into a well for isolating at least one zone in the well:
 (a) spaced inflatable elements carried by the tool;
 (b) pump means connected with the tool and operable upon rotation of the tubular member to pump fluid into said inflatable elements to sealingly engage them against the wall of the well and thereby isolate at least one zone in the well;
 (c) check valve means connected with the tool to relieve any fluid pressure in the zone between said spaced elements as they inflate;
 (d) there being passage means in the tool communicating the well below the lowermost inflatable element with the well above the uppermost inflatable element to substantially equalize the pressure in the well above and below the tool;
 (e) there being additional passage means in the tool that communicates with the well in the isolated zone; and
 (f) means for opening the additional passage means that communicates with the well in the isolated zone to the tubular member on which the tool is supported for performing desired operations in the isolated zone.

12. The invention of claim 11 wherein said pump means includes an unloading valve arrangement so that said pump will cease pumping when the discharge pressure of the fluid from said pump exceeds the pressure of the fluid in the well adjacent the location of the tool in the well by a predetermined amount.

13. The invention of claim 11 wherein said inflatable elements include reinforcing from end to end to withstand the pressures encountered in the well.

14. In a well tool adapted to be lowered on a tubular member into a well for isolating at least one zone in the well:
 (a) at least one inflatable element carried by the tool;
 (b) pump means connected with the tool and operable upon rotation of the tubular member to pump fluid into said inflatable element to sealingly engage it against the wall of the well and thereby isolate a zone in the well;
 (c) check valve means connected with the tool to relieve any fluid pressure in the zone being isolated as said element inflates;
 (d) there being passage means in the tool that communicates with the well in the isolated zone; and
 (e) means for opening the passage means in the tool that communicates with the well in the isolated zone to the tubular member on which the tool is supported for performing desired operations in the isolated zone.

15. The invention of claim 14 wherein said pump means includes an unloading valve arrangement so that said pump well cease pumping when the discharge pressure of the fluid from said pump exceeds the pressure of the fluid in the well adjacent the location of the tool in the well by a predetermined amount.

16. The invention of claim 14 wherein the inflatable element includes reinforcing from end to end to withstand the pressures encountered in the well.

17. A method of testing a well comprising the steps of:
 (a) lowering a tubular member with a tool having at least one inflatable element thereon into a well;
 (b) rotating the tubular member to pump fluid into the inflatable element to seat it against the well wall and isolate a zone in the well;
 (c) setting weight on the tubular member and tool;
 (d) retaining the weight set on the tubular member and tool to open the isolated zone to the tubular member to test the zone; and
 (e) instrumentally and continuously recording the fluid pressure of the isolated zone.

18. The method of claim 17 including the additional steps of removing the weight from the tubular member and tool to close off communication between the isolated zone and the tubular member while instrumentally and continuously recording any fluid pressure change in the isolated zone when there is no communication from the isolated zone to the tubular member.

19. The method of claim 17 including the additional steps of setting weight on the tubular member and tool and then rotating the tubular member whereby valve means in the tool is actuated to enable the inflatable element to deflate.

20. The method of claim 18 including the additional steps of setting weight on the tubular member and tool and then rotating the tubular member whereby valve means in the tool is actuated to enable the inflatable element to deflate.

21. A method of testing a well comprising the steps of:
 (a) lowering a tubular member with a tool having spaced inflatable elements thereon into a well;
 (b) rotating the tubular member to pump fluid into the inflatable elements to seat them against the well wall and isolate a zone therebetween;
 (c) relieving any fluid pressure in the zone between the spaced elements as they inflate;
 (d) communicating the well bore below the lowermost inflatable element with the well bore above the upper inflatable element;
 (e) setting weight on the tubular member and tool;
 (f) retaining the weight set on the tubular member and tool to open the isolated zone to the tubular member to test the zone; and
 (g) instrumentally and continuously recording the fluid pressure of the isolated zone.

22. The method of claim 21 including the additional steps of removing the weight from the tubular member and tool to close off communication between the isolated zone and the tubular member while instrumentally and continuously recording any fluid pressure change in the isolated zone when there is no communication from the isolated zone to the tubular member.

23. The method of claim 21 including the additional steps of setting weight on the tubular member and tool and then rotating the tubular member whereby valve means in the tool is actuated to enable the inflatable elements to deflate.

24. The method of claim 22 including the additional steps of setting weight on the tubular member and tool and then rotating the tubular member whereby valve means in the tool is actuated to enable the inflatable elements to deflate.

25. In a well tool adapted to be lowered on a tubular member into a well for isolating a zone, the invention including:
   (a) at least one inflatable element carried by the tool;
   (b) pump means connected with the tool and operable upon rotation of the tubular member to pump fluid into said inflatable element to sealingly engage it against the wall of the well and thereby isolate a zone in the well;
   (c) there being passage means in the tool for communicating the interior of the inflatable element to the well when it is desired to deflate the element, such passage means normally being closed; and
   (d) clutch means associated with the tool so that said clutch means is operable by setting weight on the tubular member and tool and then rotating the tubular member whereupon the passage means that communicates the interior of said inflatable element with the well is opened to enable said inflatable element to deflate.

26. In a well tool for use in inflating at least one inflatable element supported by a tubular member extending into a well, the invention including:
   (a) pump means with lubricating fluid therein, said pump being connected with the tool and operable upon rotation of the tubular member to pump fluid into the inflatable element to sealingly engage it with the wall of the well to isolate a zone; and
   (b) equalizing means connected with the tool for equalizing the fluid pressure in the well adjacent the location of the tool in the well with the pressure of the lubricating fluid in said pump, said equalizing means including:
      (1) a mandrel extending through said pump;
      (2) a piston slidably mounted thereon having one end exposed to fluid pressure in the well and its opposite end exposed to the lubricating fluid pressure in said pump;
      (3) an element surrounding said piston with seal means engaging said piston so that said piston may move along said mandrel in response to pressure differential between the fluid pressure in the well and lubricating fluid pressure in said pump to thereby substantially equalize the pump lubricating fluid pressure and the fluid pressure in the well.

27. In a well tool for use in inflating at least one inflatable element supported by a tubular member extending into a well, the invention including:
   (a) pump means with lubricating fluid therein, said pump being connected with the tool and operable upon rotation of the tubular member to pump fluid into the inflatable element to sealingly engage it with the wall of the well to isolate a zone;
   (b) means for rendering said pump ineffective to pump fluid to the inflatable element when the discharge pressure of the fluid from said pump exceeds the pressure of the fluid in the well adjacent the location of the tool in the well by a predetermined amount; and
   (c) equalizing means connected with the tool for equalizing the fluid pressure in the well adjacent the location of the tool in the well with the pressure of the lubricating fluid in said pump, said equalizing means including:
      (1) a mandrel extending through said pump;
      (2) a piston slidably mounted thereon having one end exposed to fluid pressure in the well and its opposite end exposed to the lubricating fluid pressure in said pump;
      (3) an element surrounding said piston with seal means engaging said piston so that said piston may move along said mandrel in response to pressure differential between the fluid pressure in the well and lubricating fluid pressure in said pump to thereby substantially equalize the pump lubricating fluid pressure and the fluid pressure in the well.

28. In a well tool adapted to be lowered on a tubular member into a well for isolating at least one zone in the well:
   (a) a pressure recorder supported by the tool for recording fluid pressure in the zone to be isolated;
   (b) at least one inflatable element carried by the tool;
   (c) pump means connected with the tool and operable upon rotation of the tubular member to pump fluid into said inflatable element to sealingly engage it against the wall of the well and thereby isolate a zone in the well;
   (d) means connected with the tool to relieve any fluid pressure in the zone being isolated as said element inflates; and
   (e) there being passage means in the tool that communicates fluid pressure in the isolated zone to the pressure recorder for instrumentally recording such fluid pressure by said recorder means.

29. In a well tool for use in inflating and deflating at least one inflatable element supported by a tubular member extending into a well, the invention including:
   (a) pump means connected with the tool and operable by rotation of the tubular member to pump fluid into the inflatable element to inflate it and seat it against the wall of the well;
   (b) a hollow mandrel in the tool and extending through said pump means;
   (c) sleeve valve means slidably supported on said mandrel;
   (d) there being first passage means in the tool for communicating the interior of the inflatable element to the well when it is desired to deflate the element, such passage means normally being closed by said sleeve valve means; and
   (e) clutch means associated with the tool which is operable by setting weight on the tubular member and tool and then rotating the tubular member to move said mandrel downwardly and thereby shift said sleeve valve to open the passage means that communicates the interior of the inflatable element with the well to enable the inflatable element to deflate.

30. The invention of claim 29 wherein said sleeve valve may be moved to its original position to close off the passage means that communicates the interior of the inflatable element with the well to enable the inflatable element to be reinflated, there being additional passage means in the tool communicating fluid to the lower end of said sleeve valve, seal means engageable between said sleeve valve and mandrel when said sleeve valve is moved to close off the passage means, there being further passage means between said mandrel and sleeve valve for communicating fluid to said pump, said last named passage means being closed when said mandrel is moved downwardly to shift said sleeve valve, said pump operable by rotation of said tubular member to pump fluid against said seal means between said sleeve valve and mandrel whereupon said sleeve valve shifts to close the passage means and open the further passage means so that fluid may then pass through the further passage means formed between the mandrel and sleeve valve to said pump for re-inflation of the inflatable element.

31. In a well tool for use in inflating and deflating at least one inflatable element supported by a tubular member extending into a well, the invention including:
(a) a hollow mandrel in the tool connected with the tubular member;
(b) a sleeve valve slidably supported on said tubular member in the tool;
(c) there being passage means in the tool for communicating the interior of the inflatable element with the well when it is desired to deflate the element, such passage means normally being closed by said sleeve valve means;
(d) pump means connected with the tool and operable by rotation of the tubular member to pump fluid into the inflatable element to inflate it and seat it against the wall of the well; and
(e) said sleeve valve movable by said mandrel to open the passage means for deflating the element by setting weight on the tubular member and tool and then rotating the tubular member, and said sleeve valve thereafter movable to close the passage by rotating the tubular member to actuate said pump.

32. In a well tool adapted to be lowered on a tubular member into a well, the invention comprising:
(a) at least one inflatable element supported on the tool;
(b) pump means connected with the tool and operable by rotation of the tubular member to pump fluid into the inflatable element to inflate it and seat it against the wall of the well;
(c) a sleeve valve slidably supported on said tubular member in the tool;
(d) there being first passage means in the tool for communicating the interior of the inflatable element to the well when it is desired to deflate the element, such passage means normally being closed by said sleeve valve means; and
(e) clutch means associated with the tool to permit up and down movement of said mandrel and the tubular member relative to said inflated element without deflating it, said clutch means also permitting rotation of the tubular member and mandrel relative to the inflated element without deflating it when no weight is set down on the tubular member, but said clutch means being engageable when weight is set down on the tubular member and rotated to move said mandrel and sleeve valve downwardly to open the first passage means whereupon said inflatable element is communicated with the well for deflation thereof.

33. The invention of claim 32 including additional passage means between said mandrel and sleeve valve for supplying fluid to said pump, seal means normally closing off said additional passage means when said sleeve valve is moved downwardly, said sleeve valve movable upwardly to open said additional passage means and close the first passage means upon rotation of the tubular member.

34. In a well tool adapted to be lowered on a tubular member into a well for iolating at least one zone in the well, the invention including:
(a) a pressure recorder supported by the tool for recording fluid pressure in the zone to be isolated;
(b) spaced inflatable elements carried by the tool;
(c) pump means connected with the tool and operable upon rotation of the tubular member to pump fluid into said inflatable elements to sealingly engage them against the wall of the well and thereby isolate at least one zone in the well; and
(d) passage means in the tool communicating the well below the lowermost inflatable element with the well above the uppermost inflatable element to substantially equalize the pressure in the well above and below the isolated zone.

35. In a well tool adapted to be lowered on a tubular member into a well for isolating at least one zone in the well, the invention including:
(a) a pressure recorder supported by the tool for recording fluid pressure in the zone to be isolated;
(b) spaced inflatable elements carried by the tool;
(c) pump means connected with the tool and operable upon rotation of the tubular member to pump fluid into said inflatable elements to sealingly engage them against the wall of the well and thereby isolate at least one zone in the well;
(d) means connected with the tool to relieve any fluid pressure in the zone between said spaced elements as they inflate; and
(e) passage means in the tool communicating the well below the lowermost inflatable element with the well above the uppermost inflatable element to substantially equalize the pressure in the well above and below the isolated zone.

36. A method of testing a well comprising the steps of:
(a) positioning a tubular member with a tool having spaced inflatable elements thereon in a well;
(b) rotating the tubular member to pump fluid into the inflatable elements to seat them against the well wall and isolate a zone in the well;
(c) relieving fluid pressure from the isolated zone as the elements inflate;
(d) setting weight on the tubular member to open the isolated zone to the tubular member; and
(e) instrumentally recording the fluid pressure of the isolated zone.

37. A method of testing a well comprising the steps of:
(a) lowering a tubular member with a tool having spaced inflatable elements thereon into a well;
(b) rotating the tubular member to pump fluid into the inflatable elements to seat them against the well wall and isolate a zone therebetween;
(c) relieving any fluid pressure in the zone between the spaced elements as they inflate;
(d) setting weight on the tubular member and tool;
(e) retaining the weight set on the tubular member and tool to open the isolated zone to the tubular member to test the zone; and
(f) instrumentally and continuously recording the fluid pressure of the isolated zone.

References Cited
UNITED STATES PATENTS

| | | | |
|---|---|---|---|
| 2,441,894 | 5/1948 | Menncier | 166—187 |
| 2,458,631 | 1/1949 | Parks | 166—187 |
| 2,675,080 | 4/1954 | Williams | 166—187 |
| 2,690,224 | 9/1954 | Roberts | 166—187 |
| 3,134,441 | 5/1964 | Barry et al. | 166—187 |

JAMES A. LEPPINK, *Primary Examiner.*

U.S. Cl. X.R.

166—101, 187, 264, 290

PO-1050
(5/69)

UNITED STATES PATENT OFFICE
CERTIFICATE OF CORRECTION

Patent No. 3,439,740  Dated April 22, 1969

Inventor(s) George E. Conover

It is certified that error appears in the above-identified patent and that said Letters Patent are hereby corrected as shown below:

Column 2, line 72, cancel "ments, said valve movable to another position by setting" and substitute -- means operable by rotation of the tubular member with --. Column 3, line 8, cancel "invetnion" and substitute -- invention --. Column 4, line 13, cancel "inflatabl" and substitute -- inflatable --. Column 8, line 7, after "resented" insert --at--. Column 12, line 50, cancel "227" and substitute -- 227b --. Column 22, line 8, cancel "position-d" and substitute -- positioned --.

SIGNED AND
SEALED
MAR 17 1970

(SEAL)
Attest:

Edward M. Fletcher, Jr.
Attesting Officer

WILLIAM E. SCHUYLER, JR.
Commissioner of Patents